United States Patent
Ng et al.

(10) Patent No.: US 11,639,052 B2
(45) Date of Patent: May 2, 2023

(54) LAYER DEBONDING

(71) Applicant: ROLLS-ROYCE plc, London (GB)

(72) Inventors: Wu Xin Charles Ng, Derby (GB); Dharun Vadugappatty Srinivasan, Derby (GB); Atin Aggarwal, Derby (GB); Sridhar Idapalapati, Derby (GB)

(73) Assignee: ROLLS-ROYCE plc, London (GB)

(*) Notice: Subject to any disclaimer, the term of this patent is extended or adjusted under 35 U.S.C. 154(b) by 131 days.

(21) Appl. No.: 16/690,321

(22) Filed: Nov. 21, 2019

(65) Prior Publication Data
US 2020/0164626 A1  May 28, 2020

(30) Foreign Application Priority Data

Nov. 27, 2018 (GB) ..................................... 1819249

(51) Int. Cl.
*B29C 73/26* (2006.01)
*B26D 3/28* (2006.01)
*B32B 43/00* (2006.01)

(52) U.S. Cl.
CPC .............. *B32B 43/006* (2013.01); *B26D 3/28* (2013.01); *B32B 2603/00* (2013.01)

(58) Field of Classification Search
CPC ............. B32B 43/006; Y10T 156/1179; Y10T 156/1184; Y10T 156/1967; Y10T 156/1983

See application file for complete search history.

(56) References Cited

U.S. PATENT DOCUMENTS

| 5,013,392 A * | 5/1991 | Virgadamo .............. B26D 3/28 |
| | | 156/254 |
| 5,897,743 A | 4/1999 | Fujimoto et al. |
| 7,314,076 B2 * | 1/2008 | Wardell ................ B32B 43/006 |
| | | 156/717 |
| 8,419,896 B2 | 4/2013 | Ciliberti et al. |
| 10,723,043 B2 * | 7/2020 | Janssen .................. B29B 17/02 |

(Continued)

FOREIGN PATENT DOCUMENTS

| DE | 19720845 A1 * | 11/1998 | ............ B29B 17/02 |
| FR | 2 787 366 A1 | 6/2000 | |

(Continued)

OTHER PUBLICATIONS

Google Patents translation of DE19720845A1, 2021. (Year: 2021).*

(Continued)

*Primary Examiner* — Alex B Efta
(74) *Attorney, Agent, or Firm* — Oliff PLC

(57) ABSTRACT

A method of debonding a first layer from a second layer, wherein the first layer is bonded to the second layer by an adhesive located between the first and second layers. The method includes inserting a blade of a cleaving tool between the first and second layers, and exerting a controlled force on the cleaving tool to move the cleaving tool so as to de-bond the first and second layers in a region. The force exerted is controlled to match a de-bonding force calculated for the region, and such that the movement of the cleaving tool stops when the calculated force is less than a force required to move the cleaving tool, and continues when the calculated force is higher than or equal to the force required to move the cleaving tool.

17 Claims, 9 Drawing Sheets

(56) References Cited

U.S. PATENT DOCUMENTS

| | | | |
|---|---|---|---|
| 2003/0009870 A1 | 1/2003 | Boschet et al. | |
| 2007/0151088 A1* | 7/2007 | Suzuki | H01M 8/04067 429/49 |
| 2008/0104789 A1 | 5/2008 | Meier et al. | |
| 2011/0061767 A1 | 3/2011 | Vontell et al. | |
| 2011/0180218 A1 | 7/2011 | Ciliberti et al. | |
| 2011/0198040 A1 | 8/2011 | Ebata et al. | |
| 2015/0144271 A1 | 5/2015 | Fujita | |
| 2018/0340421 A1* | 11/2018 | Woodruff | B64F 5/40 |

FOREIGN PATENT DOCUMENTS

| | | |
|---|---|---|
| JP | 2004-001959 A | 1/2004 |
| JP | 2007-071975 A | 3/2007 |
| JP | 2008-197131 A | 8/2008 |
| JP | 2009-078902 A | 4/2009 |
| JP | 2011-14779 A | 1/2011 |
| JP | 2011-152506 A | 8/2011 |
| JP | 2013098366 A | 5/2013 |
| JP | 2016128193 A | 7/2016 |
| WO | WO2010059906 A1 | 5/2010 |
| WO | 2015/041165 A1 | 3/2015 |

OTHER PUBLICATIONS

May 15, 2020 Extended Seach Report issued in European Patent Application No. 19205685.1.
Search Report of the Intellectual Property Office of the United Kingdom for EP1819249.2 dated Apr. 25, 2019.

* cited by examiner

LAYER DEBONDING

CROSS-REFERENCE TO RELATED APPLICATIONS

This specification is based upon and claims the benefit of priority from UK Patent Application Number 1819249.2 filed on Nov. 27, 2018, the entire contents of which are incorporated herein by reference.

BACKGROUND

1. Field of the Disclosure

The present disclosure relates to tools and methods for debonding a first layer from a second layer to which the first layer is adhered with a bonding substance such as an adhesive. The first layer may be metallic and the second layer may be polymeric, for example a carbon fibre reinforced polymer. In particular, but not exclusively, the disclosure relates to the separation of metalwork from a carbon fibre reinforced polymer (CFRP), which may be of utility for repair or recycling of composite fan blades such as blades from fans of aircraft gas turbine engines.

2. Description of the Related Art

The skilled person will appreciate that clearances between fan blade tips and an inner surface of a nacelle (or fan case) of an aircraft should generally be minimised while avoiding rubs between the fan blade tips and the nacelle surface. However, blade tip length from rotor centre to tip may vary compared to nacelle diameter due to expansion and contraction in use. This may result in blade tips touching the nacelle—i.e. tip rub. In the event of tip rub, the metal-composite interface of the composite blade may debond due to the resultant high temperatures. In this case, the metalwork may be removed and replaced in order to salvage the CFRP portion of the blade. Impacts on the blades from foreign bodies may also cause damage and result in a need for replacement.

The skilled person will appreciate that trailing edge metalwork for various composite blades can often be peeled manually relatively easily. However, the leading edge metalwork (often titanium) is normally significantly thicker and normally has a wider bonded width, making the peel force higher and manual removal harder or impossible.

In known examples, a corrosive chemical etchant is used to remove the metal, or heating is used to soften an adhesive between the metal and the polymeric component, and to cause the metal to expand, deform and pull away from the composite material.

US 2003/0009870 discloses a method and tool for separating a plate made from a material that can be heated by electromagnetic induction and retained on a supporting member by a heat-fusible adhesive from the supporting member. An inductor is displaced facing at least one strip of the plate in order to heat the strip by induction and heat the adhesive by conduction until the adhesive softens, and a tearing tool is driven so as to tear out the heated strip by hot-peeling. The inductor and the tearing tool are displaced jointly relative to the plate and the supporting member by means of a mobile frame, which is displaced on a stationary frame on which the supporting member and the plate are fixed. Speed of the inductor/tearing tool, or power to (and/or angle of) the inductor are controlled to reduce the risk of over-heating the supporting member.

It is desirable to avoid the use of corrosive etchants and to reduce the risk of damage to the polymeric component (for example by over-heating).

An improved tool and method for de-bonding is therefore required.

The skilled person will appreciate that, whilst the disclosure is presented in terms of fan blade de-bonding, the same principles could be used for any equivalent multi-layer (e.g. bi-layer) or composite material, whether or not used as a fan blade or in the aerospace industry.

SUMMARY

According to a first aspect there is provided a method of debonding a first layer from a second layer, wherein the first layer is bonded to the second layer by an adhesive located between the first and second layers.

The method comprises:
inserting a blade of a cleaving tool between the first and second layers; and
exerting a controlled force on the cleaving tool to move the cleaving tool so as to de-bond the first and second layers in a region, wherein the force exerted is controlled to match a de-bonding force calculated for the region.

For example, the force exerted is controlled such that the movement of the cleaving tool is arranged to stop if the calculated force is less than the force required to move the cleaving tool and to continue if the calculated force is higher than the force required to move the cleaving tool.

The speed of movement of the cleaving tool therefore reduces, optionally/in some cases to zero (i.e. a dwell or pause), when the force required for movement is greater than the calculated de-bonding force, so as to allow time for the adhesive in the region to weaken (e.g. softening on being heated).

The moving the cleaving tool may be continued if the calculated force is higher than or equal to the force required to move the cleaving tool.

The controlling and exerting the force exerted may be performed by a control system including one or more processing units. Any known processor, processing circuitry or the likes may provide the one or more processing units. The processing may be local or remote, and may be distributed.

The cleaving tool may be mounted on a robot. The robot may perform the exerting, and optionally the controlling, of the force on the cleaving tool. The robot may comprise a control system or may be controlled by a separate control system.

The method may be a method of removing metalwork from a carbon fibre reinforced polymer (CFRP) portion of a fan blade. The adhesive may be an adhesive that softens/weakens when heated. In such embodiments, the method may further comprise placing a heating component so as to heat a portion of the adhesive to a set temperature. The set temperature may be a temperature at which the adhesive softens. The heating component may be arranged to heat a portion of the first layer and resultantly to heat the underlying portion of the adhesive (e.g. by conduction through the first layer). The heating component may be in contact with the first layer. The de-bonding force calculated for the region may be calculated using the set temperature as the temperature of the adhesive.

The calculated debonding force for a given adhesive may decrease as temperature in-creases. The set temperature may be chosen as a trade-off between a desire to reduce the necessary force and a desire not to overheat the second layer. The set temperature may be selected to be below a temperature threshold at which damage to the second layer may be likely to occur. The set temperature may be selected to be at or above a glass transition temperature of the adhesive.

The speed of movement of the cleaving tool may therefore be reduced, optionally to zero (i.e. a dwell or pause), when the force required for movement is greater than the calculated de-bonding force for the set temperature, so as to allow time for the adhesive in the region to reach the desired temperature.

The skilled person will appreciate that the placing and inserting may be performed in either order (placing the heating component before or after the blade is inserted), or simultaneously.

The method may further comprise providing, using sensing circuitry, an indication as to at least one of:
(i) a magnitude of a currently exerted force;
(ii) a temperature of the first layer and/or of the adhesive between the first and second layers; or
(iii) a comparison between a currently exerted force and the de-bonding force calculated for the region.

The indication may be configured to provide guidance to a human user performing the method with the cleaving tool.

The sensing circuitry may comprise one or more force sensors. The sensing circuitry may comprise one or more temperature sensors. The sensing circuitry may comprise an indicator. The indicator may comprise one or more of a visual display means such as a screen or one or more lights, an audio alert means such as a speaker, and/or a tactile alert means such as a vibrating component. The sensing circuitry may therefore be arranged to provide feedback.

The calculated debonding force may be a function of position—i.e. position of the tool (with respect to the object to be debonded) along the first and second layers. The controlling the force on the cleaving tool may therefore comprise adjusting the exerted force as the cleaving tool moves. The skilled person will appreciate that bond width, stiffness of the substrates, metalwork width, and/or friction between a surface of the debonding tool and the adhesive may also influence the debonding force. The skilled person will appreciate that the adhesive may be provided over the whole area in which the first layer overlies the second layer (such that first layer width, e.g. metalwork width, may be equal to bond width), or only in a narrower portion, e.g. a strip (such that first layer width/metalwork width may be greater than bond width). Bond width may vary along the length. Further, the adhesive layer may be continuous (bond length equal to metalwork/first layer length) or may be provided in discrete elements, such that a bonded length may be shorter than first layer length, and may vary between portions of the first layer.

In embodiments in which a heating component is provided to heat the adhesive, the method may further comprise varying input power to the heating component in order to maintain a pre-determined temperature, $T_d$, on a surface of the first layer. The heating component may be located adjacent (near or in contact with) the first layer, optionally on the far side of the first layer from the adhesive. The first layer may be a metallic layer or other thermally conductive layer, so facilitating heat transfer from a heating component located on the far side of the first layer to the adhesive. The first layer may be an electrically conducting layer; in such embodiments, the heating component may be an induction heater.

The first layer may be a metallic layer. The skilled person will appreciate that the first layer being a metal or metal alloy or the likes may allow the use of an induction heater as the heating component in embodiments with a heating component. Further, higher thermal conductivity of the first layer may allow the adhesive to be heated to its set temperature more quickly than for a first layer with a lower thermal conductivity.

The pre-determined temperature of the surface may be equal to the set temperature for the adhesive. In such embodiments, equilibration of temperature between the heated portion of the first layer and the portion of adhesive bonding that portion of the first layer to the second layer may be desired before de-bonding.

In alternative embodiments, the pre-determined temperature, $T_d$, may be higher than the set temperature for the adhesive. In such embodiments, equilibration of temperature between the heated portion of the first layer and the portion of adhesive bonding that portion of the first layer to the second layer is not necessary as the conditions for the calculated de-bonding force to match the actual force required for debonding will occur (i.e. the set temperature will be reached) before the adhesive temperature reaches $T_d$. In such embodiments, $T_d$ may therefore be varied along the length of the area to be debonded, for example being higher when the metalwork is thicker to offset slower heat transfer due to the increased separation of the heating component from the adhesive, or higher when the surface area to be heated is larger, so providing increased heat transfer.

The first layer may be or comprise metalwork, for example leading-edge metalwork from the pressure or suction side of a fan blade.

The second layer may be a polymeric layer. The second layer may be a carbon fibre reinforced polymer layer.

The second layer may be a carbon fibre reinforced polymer portion of a fan blade of which the first layer forms a part of (e.g. a wing of) leading-edge (or trailing edge) metalwork.

In embodiments with a heating component, the heating component may move with the cleaving tool. The heating component may be a part of the cleaving tool. The skilled person will appreciate that it may be desirable to only heat the portion of the first layer being debonded (and thereby only the underlying portion of the adhesive being cleaved/about to be cleaved) so as to reduce or avoid wasting energy and/or excessive heating which may damage the second layer.

In embodiments with a heating component, the heating component may be urged towards the surface of the first layer overlying the portion of adhesive to be heated; for example being mounted on one or more springs.

The exerting the force on the cleaving tool to move the cleaving tool may comprise pulling the cleaving tool, for example by a handle of the cleaving tool. The blade may have two ends and the handle may be connected to each end of the blade, which may facilitate an even force distribution across the blade.

The method may comprise, if or when the movement of the cleaving tool is stopped due to the calculated force being less than force required to move the cleaving tool, either:
(i) maintaining the calculated force on the tool, e.g. until it is able to move forward.
(ii) removing the calculated force and re-trying movement by re-applying the calculated force after a predetermined time interval.

According to a second aspect, there is provided a cleaving tool arranged to de-bond (e.g. automatically debond) a first layer from a second layer, wherein the first layer is bonded to the second layer by an adhesive located between the first and second layers.

The cleaving tool comprises:
a blade arranged to be inserted between the first and second layers; and
control circuitry arranged to exert a force so as to move the blade to de-bond the first and second layers in a region, wherein the force exerted is controlled to match a de-bonding force calculated for the region.

For example, the force exerted is controlled such that movement of the cleaving tool is arranged to stop if the calculated force is less than force required to move the cleaving tool and to continue if the calculated force is higher than the force required to move the cleaving tool.

The cleaving tool may be arranged to be mounted on, and moved by, a robot.

The cleaving tool may further comprise a heating component arranged to heat a portion of the adhesive to a set temperature at which the adhesive softens. The de-bonding force calculated for the region may be calculated using the set temperature as the temperature of the adhesive. The set temperature may be equal to or greater than a glass transition temperature of the adhesive.

The blade may be flexible. The blade may be arranged to be sufficiently flexible to conform to the curvature of a fan blade contour.

The cleaving tool and first and second layers may have any of the features as described with respect to the first aspect.

According to a third aspect, there is provided a cleaving tool arranged to be used by a user to debond a first layer from a second layer, wherein the first layer is bonded to the second layer by an adhesive located between the first and second layers. The cleaving tool may be arranged to be operated manually.

The cleaving tool comprises:
a blade arranged to be inserted between the first and second layers and moved so as to de-bond the first and second layers in a region; and
sensing circuitry, the sensing circuitry comprising a force sensor and being arranged to provide an indication as to at least one of:
(i) a magnitude of a currently exerted force;
(ii) a comparison between a currently exerted force and a de-bonding force calculated for the region and the set temperature of the adhesive; or
(iii) a temperature of the first layer and/or of the adhesive, wherein the indication is configured to provide guidance to a user of the cleaving tool to enable the user to control the force exerted so as to match the de-bonding force calculated for the region.

The cleaving tool may further comprise a heating component arranged to heat a portion of the adhesive to a set temperature at which the adhesive softens. The de-bonding force calculated for the region may be calculated using the set temperature as the temperature of the adhesive.

The blade may be flexible. The blade may be arranged to be sufficiently flexible to conform to the curvature of a fan blade contour.

The blade may be made of a polymeric material, for example a nylon polymer material.

This blade may be replaceable. The material of the blade may be selected to be sacrificially damaged if any force applied is too large, to avoid causing damage to the object to be debonded (e.g. a composite fan blade).

The cleaving tool and first and second layers may have any of the features as described with respect to the first and second aspects.

The cleaving tool may comprise a handle arranged to be pulled by the user to move the blade. The skilled person will appreciate that the same cleaving tool may be used with a robot or the likes in an automated debonding assembly—the handle may be gripped by a robot in such embodiments.

In embodiments according to the second or third aspects having a handle, the handle may be attached to each end of the blade.

In embodiments according to the second or third aspects, the blade may be serrated. The serrations may serve to concentrate local perpendicular tensile stresses on the adhesive.

The cleaving tool may further comprise a wedge-shaped member having a narrower forward region and a wider rear region. The blade may be located on or near, or provided by, the narrower forward region of the wedge. The wedge-shaped member may therefore be described as a wedge-shaped blade. The wedge may have a wedge angle of between 3° and 30°, and optionally between 3° and 14° and optionally round 7°—the skilled person will appreciate that a narrow angle and a longer wedge length may reduce the minimum de-bonding force.

The wedge-shaped member may have a width (along the blade/perpendicular to the direction of movement in use) of between 5 cm and 30 cm, optionally between 10 cm and 20 cm, and further optionally between 15 cm and 20 cm. The wedge-shaped member may be around 19 cm wide in some embodiments.

The wedge-shaped member may have a width selected to be around 10 mm greater than the width of the layer to be de-bonded.

The wedge-shaped member may have a length (perpendicular to the blade/parallel to the direction of movement in use/from the narrower forward region to the wider rear region) of between 0.5 cm and 5 cm, optionally between 1 cm and 4 cm and further optionally between 2 cm and 3 cm. The wedge-shaped member may be around 26 mm long in some embodiments.

According to a fourth aspect, there is provided a debonding assembly arranged to debond a first layer from a second layer, wherein the first layer is bonded to the second layer by an adhesive located between the first and second layers. The debonding may be automated.

The debonding assembly comprises:
a cleaving tool comprising a blade arranged to be inserted between the first and second layers;
a robot arranged to move the cleaving tool so as to de-bond the first and second layers in a region; and
a control system arranged to control the robot to exert a controlled force on the cleaving tool to move the cleaving tool, wherein the force exerted is controlled to match a de-bonding force calculated for the region.

For example, the force exerted is controlled such that movement of the cleaving tool is arranged to stop if the calculated de-bonding force is less than the force required to move the cleaving tool and continued if the calculated de-bonding force is higher than the force required to move the cleaving tool.

The debonding assembly may comprise a force sensor arranged to generate a force signal representative of the force exerted by the robot on the cleaving tool. The control system may be arranged to receive the force signal from the force sensor and to use this feedback in controlling the robot.

The debonding assembly may comprise a temperature sensor arranged to generate a temperature signal representative of the temperature of the adhesive in the region of the cleaving tool. The control system may be arranged to receive the temperature signal from the temperature sensor and to use this feedback in controlling the robot.

The calculated debonding force may be a function of position. The controlling the force on the cleaving tool may comprise adjusting the exerted force with position as the cleaving tool moves.

The cleaving tool may further comprise a heating component arranged to heat a portion of the adhesive to a set temperature at which the adhesive softens. The de-bonding force calculated for the region may be calculated using the set temperature as the temperature of the adhesive.

The debonding assembly may further comprise a power supply. The power supply may be configured to provide varying input power to the heating component in order to maintain a pre-determined temperature, $T_d$, on a surface of the first layer. The pre-determined temperature of the surface may be equal to the set temperature for the adhesive.

The first layer may be a part of (e.g. a wing of) leading-edge (or trailing edge) metalwork of a fan blade and/or the second layer may be a carbon fibre reinforced polymer portion of the fan blade.

The heating component may be arranged to move with the cleaving tool. The heating component may be a part of the cleaving tool.

The robot may be arranged to move the cleaving tool by pulling the cleaving tool by a handle of the cleaving tool. The handle may be attached to each end of the blade. The handle may extend forward of the blade.

The control system may be arranged to, if or when the cleaving tool stops moving due to the calculated force being less than force required to move the cleaving tool, maintaining the same force on the tool until it is able to move forward.

Alternatively, the control system may be arranged to remove the applied force, optionally for a predetermined time interval, if or when the cleaving tool stops moving due to the calculated force being less than force required to move the cleaving tool.

The control system may be arranged to re-try movement, by re-applying the calculated force, after the predetermined time interval.

The blade may be serrated.

The cleaving tool may be or comprise a cleaving tool as described with respect to the second or third aspects.

The debonding assembly may be arranged to perform the method of the first aspect.

According to a fifth aspect, there is provided a computer-readable medium comprising instructions for debonding a first layer from a second layer, wherein the first layer is bonded to the second layer by an adhesive located between the first and second layers.

The instructions are arranged such that, when they are read by a processing apparatus arranged to operate a robot carrying a cleaving tool, that processing apparatus is caused to instruct the robot to perform the following steps:

exert a controlled force on the cleaving tool to move the cleaving tool so as to de-bond the first and second layers in a region, wherein the force exerted is controlled to match a de-bonding force calculated for the region, such that movement of the cleaving tool is arranged to stop if the calculated force is less than force required to move the cleaving tool and to continue if the calculated force is higher than the force required to move the cleaving tool.

The instructions may be arranged such that, when they are read by the processing apparatus, the processing apparatus is caused to instruct the robot to insert a blade of the cleaving tool between the first and second layers. In alternative embodiments, the insertion of the blade may be performed separately; optionally manually.

The processing apparatus may be caused to instruct the robot to place a heating component of the cleaving tool so as to heat a portion of the adhesive to a set temperature at which the adhesive softens. The de-bonding force calculated for the region may be calculated using the set temperature as the temperature of the adhesive. In alternative embodiments, no heating component may be present, or the heating component may be placed separately; optionally manually.

The skilled person will appreciate that the placing and inserting may be performed in either order, or simultaneously.

The instructions may be arranged such that, when they are read by a processing apparatus arranged to operate a robot carrying a cleaving tool, that processing apparatus is caused to instruct the robot to perform the method of the first aspect. The processing apparatus may be a part of the robot or separate.

In all of the above aspects, the debonding force calculated for the region may be obtained in a preliminary step in a laboratory setup. In detail, the debonding force per unit width of the first and second layer at a given temperature may be measured on planar or curved geometry by coupon level mechanical testing, in a laboratory setup and it may be extrapolated to the actual width of the first and second layer. Following that, the debonding force at different sections and/or different temperatures may be fine-tuned by debonding a sample of the first and second layer without any damage.

For example, when the first layer and the second layer are metalwork and a carbon fibre reinforced polymer (CFRP) portion of a fan blade, the debonding force per unit width of the fan blade at a given temperature may be measured on planar or curved geometry by coupon level mechanical testing, in a laboratory setup and it may be extrapolated to the width of the fan blade. Moreover, the debonding force at different sections and/or different temperatures may be fine-tuned by debonding a sample fan blade without any damage.

The debonding force so calculated may then be provided as input in any one of the aspects illustrated above.

According to a sixth aspect, there is provided a cleaving tool arranged to debond a first layer from a second layer, wherein the first layer is bonded to the second layer by an adhesive located between the first and second layers. The cleaving tool comprises:

(i) a wedge-shaped member having a narrower forward region and a wider rear region, and a blade located on (for example, being provided by or connected to) the narrower forward region, the wedge-shaped member being arranged to be inserted between the first and second layers and having a first side region and a second side region opposing the first side region with the blade extending therebetween;

(ii) member and comprising a gripping portion located forward of the blade and arranged to be gripped to pull the tool; and (iii) a heating component arranged to heat a portion of the adhesive forward of the blade to a set temperature to soften the adhesive, the heating component being mounted on the cleaving tool so as to be biased towards the portion of the adhesive to be heated.

The heating component may be mounted adjacent (e.g. near and above in the orientation shown in the Figures) and/or forward of the blade. The heating component may be biased towards the blade, and/or downward (in the orientation shown in the Figures).

The bladed wedge-shaped member may be referred to as a wedge-shaped blade. The blade may be provided by a sharp edge of the wedge-shaped member. The sharp edge may be provided by the forward edge of the wedge-shaped member with a constant wedge angle, or the wedge angle may differ in the region of the forward edge.

The blade may be serrated.

The blade may be flexible. The blade may be arranged to be sufficiently flexible to conform to the curvature of a fan blade contour.

The blade may be made of a polymeric material, for example a nylon polymer material.

This blade may be replaceable, for example being detachably connected to the wedge-shaped member, or replaceable as part of a replaceable wedge-shaped member.

The material of the blade may be selected to be sacrificially damaged if any force applied is too large, to avoid causing damage to the object to be debonded (e.g. a composite fan blade).

The wedge angle of the blade may be between 3° and 14°, and optionally around 7°.

The blade may be sufficiently thin to fit between the first and second layers without deforming the layers; i.e. the blade may have a thickness no greater than that of the adhesive layer therebetween. The blade may have a thickness less than that of the adhesive layer. The thickness of the blade may be between 0.1 mm and 1.5 mm, and optionally between 0.25 mm and 1 mm, in some embodiments. The skilled person will appreciate that, in such embodiments, the minimum debonding force for separating the layers may not be related to the thickness of the first layer, as the first layer does not need to be deformed at the point of cleaving.

The narrower forward region of the wedge-shaped member may also be thin enough to fit between the layers without deforming the layers; i.e. may have a thickness no greater than that of the adhesive layer therebetween.

The handle may be arranged to be gripped by a person or by a machine.

The handle may comprise first and second struts, each strut extending between the gripping portion and the corresponding first or second side region of the wedge-shaped member. The skilled person will appreciate that the handle being connected to the blade on each side of the portion to be debonded/on each side of the blade may facilitate an even force distribution across the blade. The struts may be parallel to each other and perpendicular to the blade.

The handle may be arranged to facilitate the tool being pulled across a surface of an object so as to debond the first layer from the second layer.

The gripping portion of the handle may be parallel to the blade and spaced from the blade by the struts of the handle.

The handle may extend forward of the blade (forward meaning in an intended direction of movement of the tool—the intended direction may be at least substantially perpendicular to a width of the wedge-shaped member and extending from the blade/from the narrower forward edge of the wedge-shaped member).

The heating component may be or comprise an induction heater.

The heating component may be mounted to the tool by means of one or more springs or other biasing elements.

The biasing of the heating component may be arranged to urge the heating component towards a surface of the first layer in use, the first layer being between the blade and the heating component. The biasing of the heating component may be arranged to bring the heating component near to, or in contact with, the surface of the first layer in use.

The heating component may be mounted on the tool forward of the blade (in an intended direction of movement of the tool) such that a portion of the adhesive is heated before the blade reaches that portion. The skilled person will appreciate that the pre-heating may facilitate debonding by softening the adhesive and so reducing the minimum required de-bonding force.

The cleaving tool may be used to perform the method of the first aspect.

The cleaving tool may be or comprise the cleaving tool as described in any preceding aspect.

The skilled person will appreciate that features described with respect to one aspect may be applied to any other aspect, mutatis mutandis.

As noted elsewhere herein, the present disclosure may relate to repair and/or recycling of parts for a gas turbine engine, such as fan blades. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

The gearbox is a reduction gearbox (in that the output to the fan is a lower rotational rate than the input from the core shaft). Any type of gearbox may be used. For example, the gearbox may be a "planetary" or "star" gearbox, as described in more detail elsewhere herein. The gearbox may have any desired reduction ratio (defined as the rotational speed of the input shaft divided by the rotational speed of the output shaft), for example greater than 2.5, for example in the range of from 3 to 4.2, for example on the order of or at least 3, 3.1, 3.2, 3.3, 3.4, 3.5, 3.6, 3.7, 3.8, 3.9, 4, 4.1 or 4.2. The gear ratio may be, for example, between any two of the values in the previous sentence. A higher gear ratio may be more suited to "planetary" style gearbox. In some arrangements, the gear ratio may be outside these ranges.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds). These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm or 390 cm (around 155 inches). The fan diameter may be in an inclusive range bounded by any two of the values in the previous sentence (i.e. the values may form upper or lower bounds).

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 250 cm to 300 cm (for example 250 cm to 280 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 320 cm to 380 cm may be in the range of from 1200 rpm to 2000 rpm, for example in the range of from 1300 rpm to 1800 rpm, for example in the range of from 1400 rpm to 1600 rpm.

In use of the gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.3, 0.31, 0.32, 0.33, 0.34, 0.35, 0.36, 0.37, 0.38, 0.39 or 0.4 (all units in this paragraph being $Jkg^{-1}K^{-1}/(ms^{-1})^2$). The fan tip loading may be in an inclusive range bounded by any two of the values in the previous sentence (i.e. the values may form upper or lower bounds).

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, 17, 17.5, 18, 18.5, 19, 19.5 or 20. The bypass ratio may be in an inclusive range bounded by any two of the values in the previous sentence (i.e. the values may form upper or lower bounds). The bypass duct may be substantially annular. The bypass duct may be radially outside the core engine. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds).

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}s$, 105

Nkg⁻¹s, 100 Nkg⁻¹s, 95 Nkg⁻¹s, 90 Nkg⁻¹s, 85 Nkg⁻¹s or 80 Nkg⁻¹s. The specific thrust may be in an inclusive range bounded by any two of the values in the previous sentence (i.e. the values may form upper or lower bounds). Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). The thrust referred to above may be the maximum net thrust at standard atmospheric conditions at sea level plus 15 deg C. (ambient pressure 101.3 kPa, temperature 30 deg C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds). The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades may be formed integrally with a central portion. Such an arrangement may be referred to as a bladed disc or a bladed ring. Any suitable method may be used to manufacture such a bladed disc or bladed ring. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 14, 16, 18, 20, 22, 24 or 26 fan blades.

As used herein, cruise conditions may mean cruise conditions of an aircraft to which the gas turbine engine is attached. Such cruise conditions may be conventionally defined as the conditions at mid-cruise, for example the conditions experienced by the aircraft and/or engine at the midpoint (in terms of time and/or distance) between top of climb and start of de-cent.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be the cruise condition. For some aircraft, the cruise conditions may be outside these ranges, for example below Mach 0.7 or above Mach 0.9.

Purely by way of example, the cruise conditions may correspond to standard atmospheric conditions at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to: a forward Mach number of 0.8; a pressure of 23000 Pa; and a temperature of −55 deg C.

As used anywhere herein, "cruise" or "cruise conditions" may mean the aerodynamic design point. Such an aerodynamic design point (or ADP) may correspond to the conditions (comprising, for example, one or more of the Mach Number, environmental conditions and thrust requirement) for which the fan is designed to operate. This may mean, for example, the conditions at which the fan (or gas turbine engine) is designed to have optimum efficiency.

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Embodiments will now be described by way of example only, with reference to the Figures, in which.

DETAILED DESCRIPTION OF THE DISCLOSURE

Figure 1:
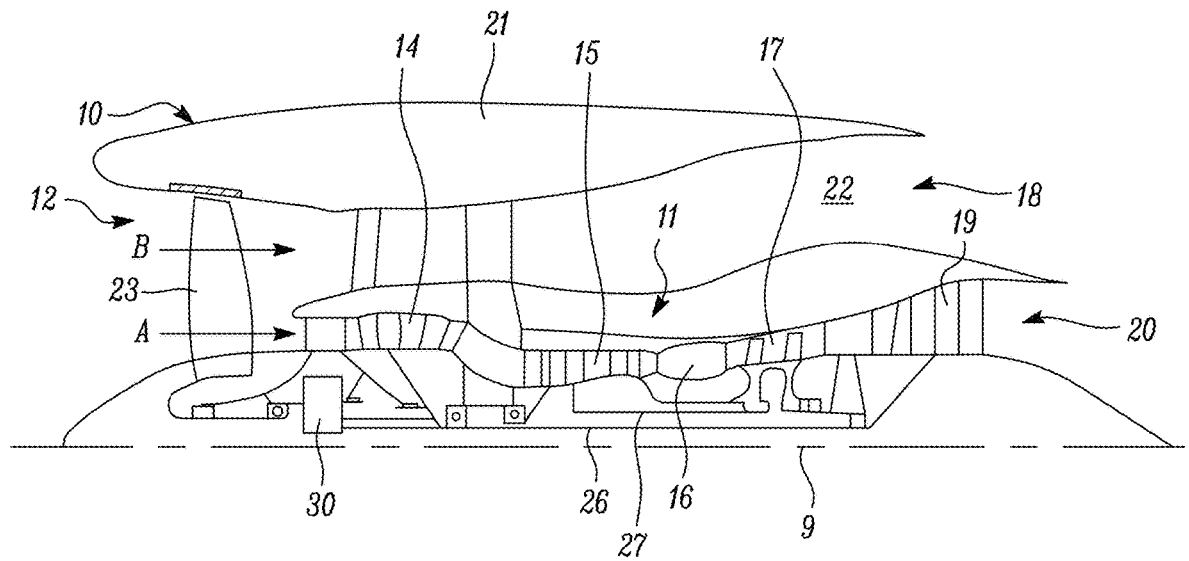
FIG. 1 is a sectional side view of a gas turbine engine.

In the figures, like reference numerals are used for like components.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
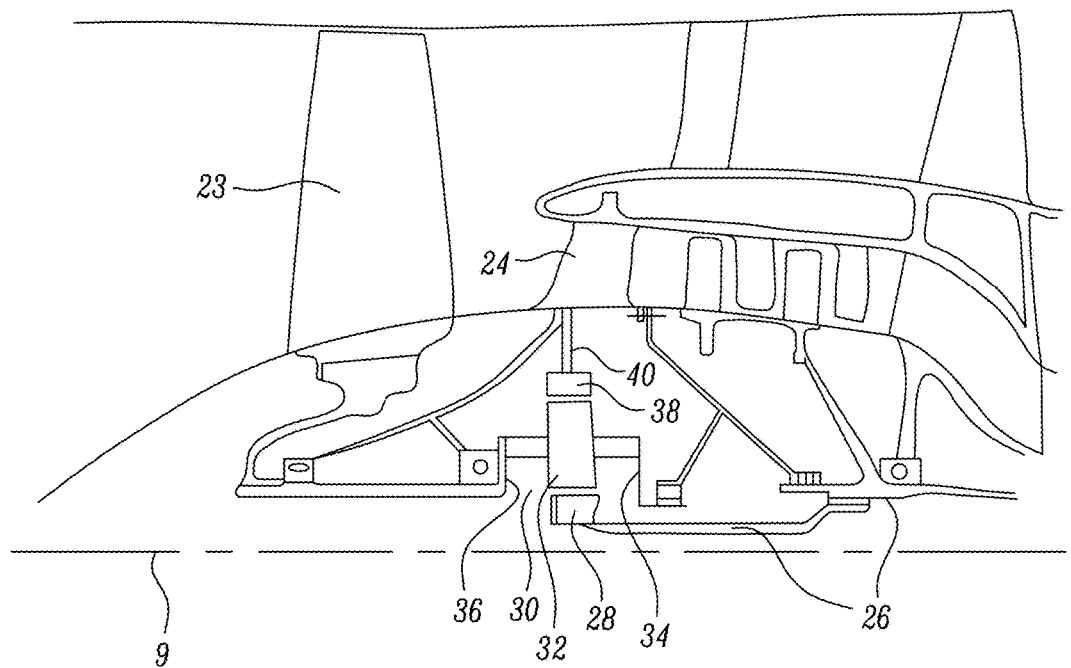
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to process around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
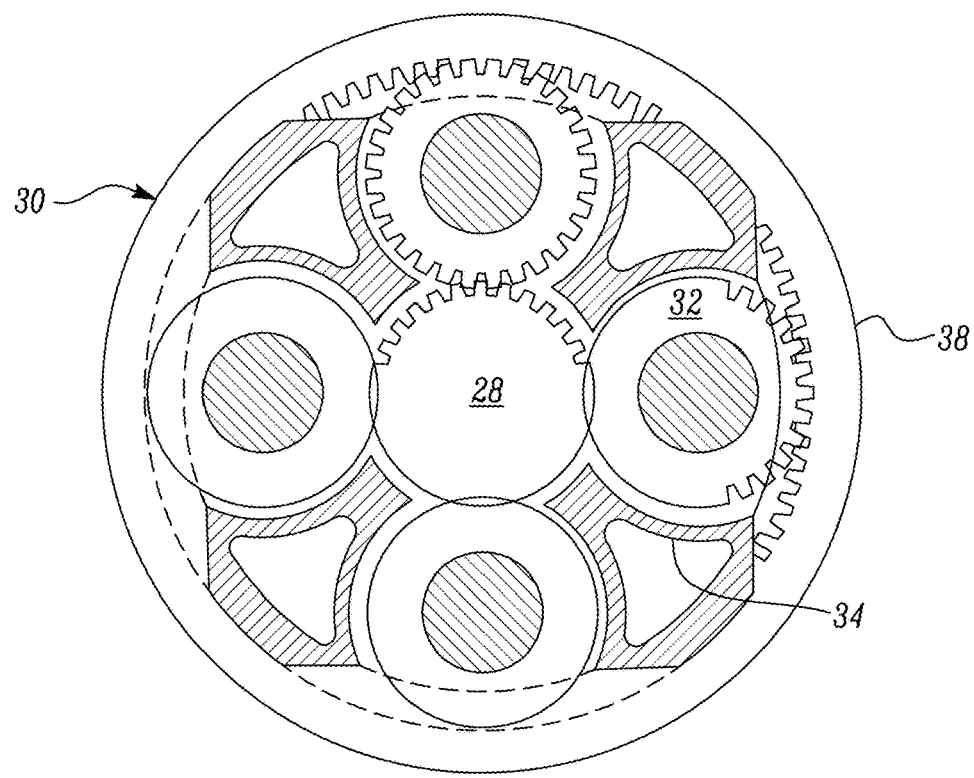
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to fan blades of a turbofan engine, the disclosure may apply, for example, to blades of any type of gas turbine engine, such as an open rotor (in which the fan stage is not surrounded by a nacelle) or turboprop engine, for example. Further, the disclosure may apply to any composite part or item from which a component is to be removed—for example aircraft doors, vehicle components or the likes. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Figure 4:
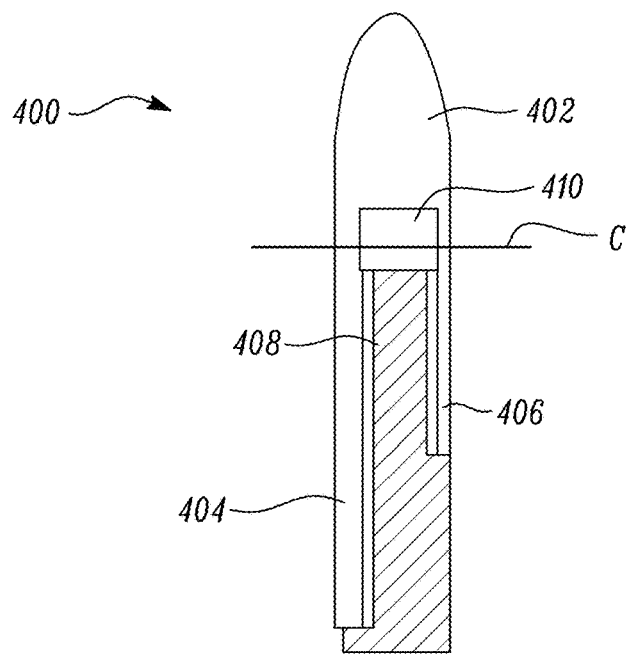
FIG. 4 is a schematic cross-sectional view of a leading edge region of a fan blade.

FIG. 4 illustrates a cross-sectional view of a leading edge portion of a fan blade 400.

The fan blade 400 comprises a core 408. In the embodiment being described, the core 408 is made of a composite material, and more specifically of a carbon fibre reinforced polymer (CFRP).

The fan blade 400 comprises a leading edge portion 402, referred to as a "bullet" due to its cross-sectional shape. A forward edge of the bullet forms the leading edge of the fan blade 400.

In the embodiment being described, leading edge metalwork 401 dads a forward edge of the composite core 408, protecting the composite core 408. In the embodiment being described, the leading edge metalwork 401 provides the leading edge of the blade 400.

In the embodiment being described, the leading edge metalwork 401 comprises the bullet 402 and two "wings" 404, 406 extending from the bullet 402. One wing 404, 406 extends over a portion of each surface of the fan blade 400. One wing 404 forms a portion of the pressure surface of the blade 400 in use. The other wing 406 forms a portion of the suction surface of the blade 400 in use.

In the embodiment being described, the wing 404 on the pressure surface of the blade 400 is thicker than the wing 406 on the suction surface of the blade 400.

In the embodiment being described, the wing 404 on the pressure surface of the blade 400 is wider than the wing 406 on the suction surface of the blade, extending further across the surface of the blade 400.

In the embodiment being described, each wing 404, 406 is bonded to the core 408 across the entire width of the wing—the width may therefore be referred to as a bonded width ($W_1$ for the pressure surface wing 404, and $W_2$ for the suction surface wing 406). In alternative embodiments, only a portion of the width of each wing 404, 406 may be bonded to the core 408; in such embodiments, the bonded width may be less than the wing width.

In the embodiment being described, the bonded width $W_1$ for the pressure surface wing 404 varies along the length of the blade 400. In the embodiment being described, the bonded width $W_2$ for the suction surface wing 406 is substantially constant along the length of the blade 400.

In the embodiment being described, the wings 404, 406 have different bonded widths $W_1$, $W_2$ and the same bonded length $L_1$. In alternative embodiments, the bonded lengths may differ and/or the bonded widths may be the same.

In the embodiment being described, the bullet 402 and wings 404, 406 are formed integrally—i.e. the leading edge metalwork 401 is provided as a single piece.

In the embodiment being described, the bullet 402 and wings 404, 406 are made of a metal or alloy, and may therefore be described as metallic.

The skilled person will appreciate that blade and bullet shape may vary in different blade designs. Further, trailing edge metalwork may also be provided, to clad a rearward edge of the composite core 408 and to provide the trailing edge of the blade 400.

An adhesive 410 bonds the core 408 to the metalwork 401. The adhesive 410 forms a layer on each side of the core 408, between the core 408 and the wings 404, 406. The layer of adhesive 410 between each side of the core 408 and a wing 404, 406 may be relatively thin compared to the width of the wings and core, and may have an at least substantially constant thickness, for example being between 0.5 mm and 3 mm, and more specifically between 0.5 mm and 1.5 mm in the embodiment being described.

The adhesive 410 also extends between an outer end of the core 408 and the bullet 402. The layer of adhesive 410 between the outer end of the core 408 and the bullet 402 may be thicker than the layers between the core 408 and wings 402, 406, for example being between 3 mm and 5 mm thick in the embodiment shown.

In the embodiment being described, the adhesive 410 is an epoxy adhesive with a glass transition temperature of between 100° C. and 180° C., and optionally in the range 120-140° C.). The skilled person will appreciate that different adhesives 410 may be used in different embodiments. When a heating component is to be used to weaken the adhesive, an adhesive 410 that weakens at a higher temperature is selected. The skilled person will appreciate that the nature of the second layer 408 may provide an upper limit on suitable temperatures to which the adhesive 410 can be heated whilst avoiding or minimising damage to the second layer 408.

Line C in FIG. 4 approximately indicates the location of the forward edge of the composite core 408. Line C in the perspective images of the metalwork 401 shown in FIGS. 5A and 5B correspondingly demonstrates the intended approximate location of the forward edge of the composite core 408, when the metalwork 401 is fitted to a core 408.

Figure 5A:
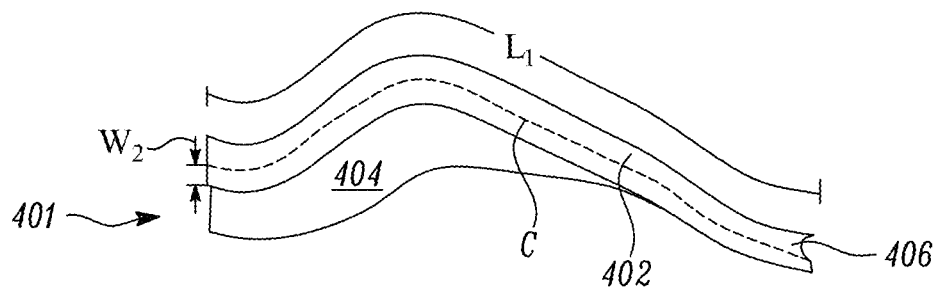
FIGS. 5A and 5B are two different perspective views of leading edge metalwork for a fan blade.

In FIG. 5A, the leading edge metalwork 401 is shown with the bullet 402 upper-most. The outer surface of the suction surface wing 406 is visible, as is a portion of the inner surface of the pressure surface wing 404. In use in a blade 400, the inner surface of the pressure surface wing 404 is adhered to the pressure side of the composite core 408. Line C illustrates the intended position of the forward edge of the composite core 408.

Figure 5B:
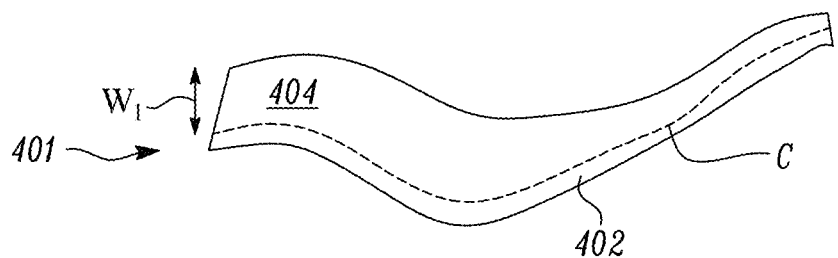

In FIG. 5B, the leading edge metalwork 401 is shown with the bullet 402 lower-most. The outer surface of the pressure surface wing 404 is visible. As the suction side wing 406 is shorter, it is not visible in this view.

The skilled person will appreciate that the bullet 402 may be damaged by impact, and/or that the pressure side 404 and/or suction side 406 metalwork may be damaged by impact, leading to a need for replacement of the metalwork 401. The skilled person will appreciate that the core 408 is less likely to be damaged by impacts and the like, and therefore can be re-used if the metalwork 401 can be debonded with minimal or no damage to the core 408. It is also possible that the metal to composite interface (provided by the adhesive 410) may at least partially debond, for example due to the high temperatures from friction in a tip-rub event. In this case, the metalwork may be removed and replaced to salvage the core 408 of the blade 400.

In the disclosure, embodiments are described with respect to debonding the fan blade 400 by removing the metalwork 401, and in particular the wings 404, 406, from the core 408. The wing 404, 406 to be removed is referred to as a first layer 404, 406 and the core 408 as a second layer 408. The skilled person will appreciate that the methods and tools described herein are not limited to this use, and that fan blades 400 are described by way of an example of an object to be debonded only.

In this disclosure, methods and tools for simultaneously heating and cleaving the wings 404, 406 from the core 408 surface are described. In alternative embodiments, the adhesive may not be heated to soften/weaken it before cleaving, or the adhesive may be softened/weakened in a different way (e.g. by use of a solvent).

The skilled person will appreciate that trailing edge metalwork (not shown) for various composite blades can be peeled manually relatively easily. Embodiments of the disclosure may therefore have particular utility in debonding the leading edge metalwork 401 (often titanium), which is generally significantly thicker and wider along its bonded length $L_1$ (i.e. having a greater bonded width, $W_1$, $W_2$), making the peel force higher and manual removal more difficult. Bonded length is marked $L_1$ in FIG. 5A; the width of the adhesive layer (the bonded width; $W_1$, $W_2$) may vary along this length. In the embodiment being described, both wings 404, 406 have the same bonded length $L_1$; in alternative embodiments, the bonded lengths may differ.

The skilled person would appreciate that the force required to de-bond the layers may be dependent on, for example proportional to, the bonded width $W_1$, $W_2$. The de-bonding force may therefore increase when the wing 404 widens.

Cleavage stresses (concentrated tensile stresses applied perpendicular to the bondline) generally represent the most severe form of loading experienced by a bonded joint. Thus, the tool and method described herein may be used to debond the metalwork 404, 406 from the composite core 408 surface with minimal force via cleavage stresses instead of peel stresses, as the debonding force may not be affected, or may be less affected, by the thickness of the metalwork 404, 406 (as compared to peel stresses, which depend strongly on metal thickness).

Figure 10:
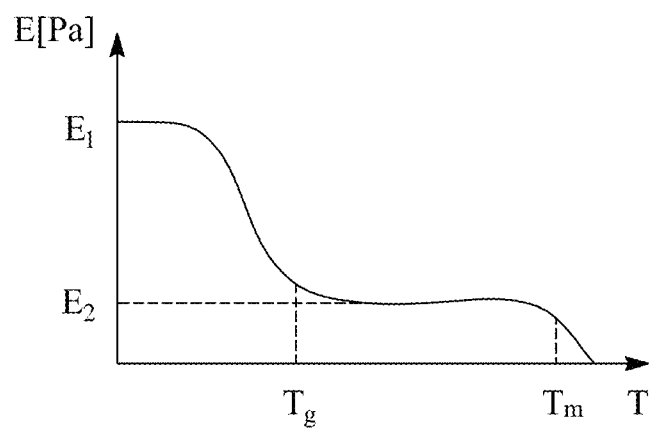
FIG. 10 illustrates a relationship between bond strength and temperature for an adhesive material.

Methods and tools of the embodiments being described utilise the principle that by heating the adhesive, the bond can be weakened, so facilitating de-bonding of the layers. FIG. 10 shows a graph of bond strength (E) in Pa against temperature (T). As temperature increases towards the glass transition temperature ($T_g$) of the adhesive 410, the adhesive 410 softens, so weakening the bond strength. For commonly-used adhesives which soften with increasing temperature, the bond strength generally plateaus between the glass transition temperature and the melting point ($T_m$) of the adhesive 410. For an adhesive 410 with behaviour as shown in the graph of FIG. 10, the bonding strength reduces by around 80% between its room temperature strength ($E_1$) and its strength ($E_2$) in the temperature range between its glass transition temperature and its melting temperature. The skilled person will appreciate that the melting temperature may be significantly higher than the glass transition temperature—as it is desirable not to over-heat the second layer 408 in the embodiment being described, a temperature at or near the glass transition temperature is used for cleaving the layers in the embodiment being described. The adhesive 410 is therefore heated to a set temperature at or near its glass transition temperature.

Figure 6:
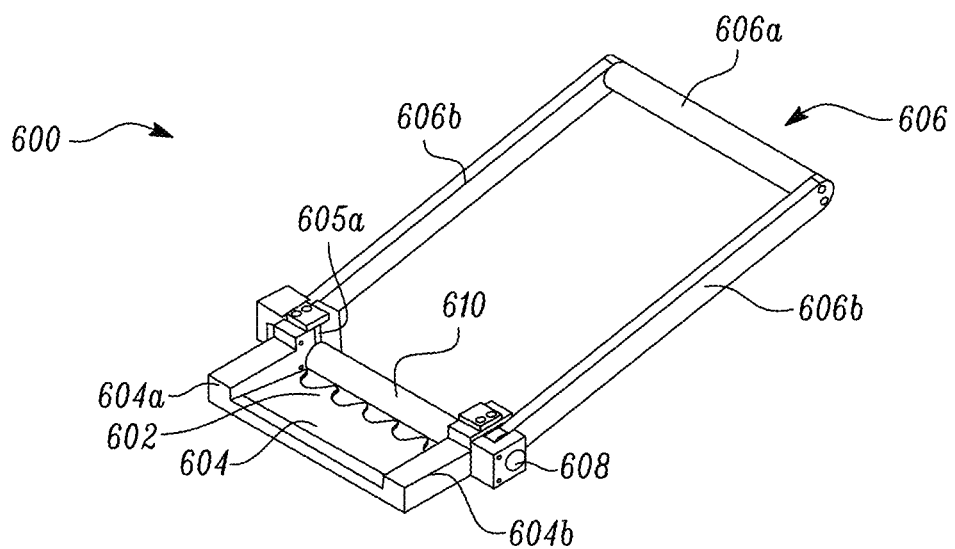
FIG. 6 is a perspective view of a cleaving tool.

A cleaving tool 600 of an embodiment is shown in FIG. 6.

The cleaving tool 600 comprises a blade 602. The blade 602 is arranged to mechanically cleave the first layer 404, 406 (the pressure surface wing or suction surface wing for the blade 400 described) from the second layer 408 (the composite core for the blade 400 described).

In the embodiment being described, the blade 602 is integral with a wedge element 604, which may also be referred to as a wedge-shaped member 604. The blade 602 is formed by a sharp edge of the wedge element 604 in the embodiment being described. In alternative embodiments, the blade 602 may be mounted on the narrower region of the wedge element 604. The narrower region may be referred to as a narrower forward region, and the sharp edge as a forward or leading edge. The forward or leading edge is the first part of the wedge element 604 to enter the adhesive 410 when the tool 600 is inserted and moved so as to debond the layers.

The blade 602 extends along a narrow edge of the wedge element 604.

In the embodiment being described, the wedge element 604 has a width, W, of around 190 mm. The blade 602 extends along the width of the wedge element 604.

In the embodiment being described, the wedge element 604 has a length, L, of around 25-30 mm. The length of the wedge element 604 is arranged to be parallel to the direction of motion in use/perpendicular to the blade edge 602.

Figure 16A:
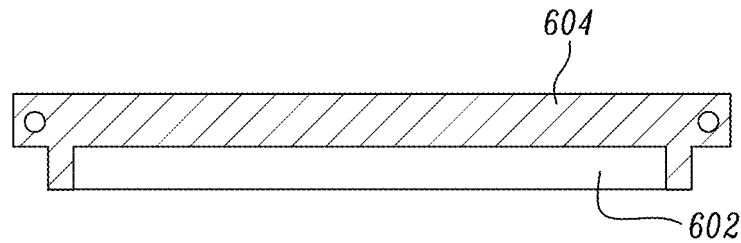
FIGS. 16A-C illustrate three different blades for a cleaving tool.

In the embodiment being described, the blade 602 is serrated. In alternative embodiments, the blade 602 may not be serrated, as shown in FIG. 16A.

In the embodiment being described, the blade 602 has a scalloped edge, providing curved serrations. In the embodiment shown in FIGS. 6 and 13, the curved serrations are broader in the concave parts of the scalloping and narrower (more pointed/higher curvature) in the convex part of the scalloping.

Figure 16B:
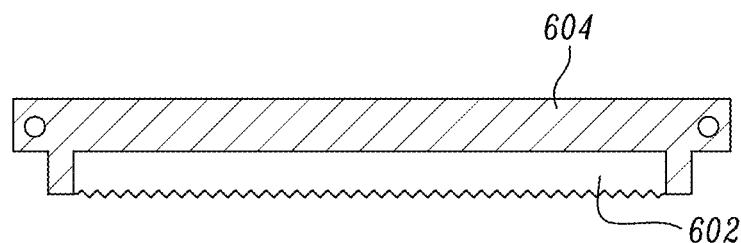
Figure 16C:
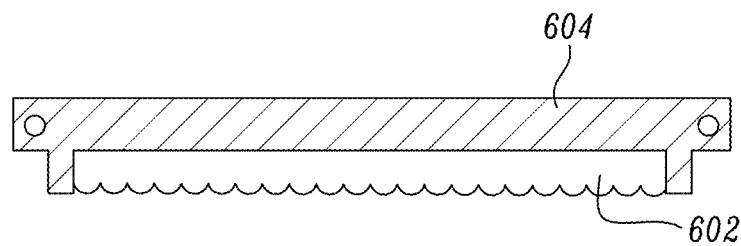

In alternative embodiments with serrated blades 602, the concave and convex parts of the scalloping may have equivalent curvatures, or the curvatures may be reversed as shown in FIG. 16C. In still further alternative embodiments, the serrations may be angled instead of curved as shown in FIG. 16B. The width and number of serrations may also differ between embodiments. The skilled person will appreciate that any suitable serration known in the art may be used. The skilled person will appreciate that serration wedge angle and edge thickness may also be modified in various embodiments.

In the embodiment being described, the blade 602 is made of a flexible material, and more specifically of a nylon polymer material. In the embodiment being described, blade material and dimensions are selected to allow the blade 602 to conform to the curvature of the object to be debonded; in this case the curvature of the fan blade 400 contour.

In the embodiment being described, the blade material is selected to be softer than the composite material 408, such that the blade 602 may be sacrificially damaged in preference to damage to the composite core 408 of the fan blade 400.

In the embodiment being described, the blade 602 is detachably mounted on the tool 600 such that the blade 602 can be replaced, for example when damaged.

The blade 602 is intended to be inserted between first and second layers 404, 406, 408 of the object to be debonded (the composite fan blade 400 in the embodiment being described).

Figure 8A:
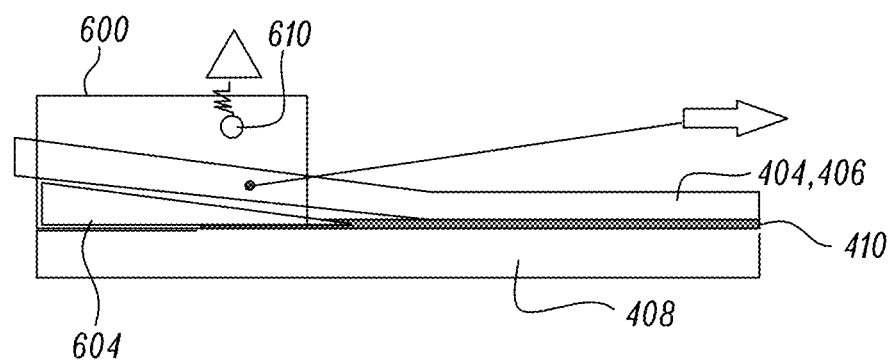
FIG. 8A is a schematic side view of use of a cleaving tool.
Figure 8B:
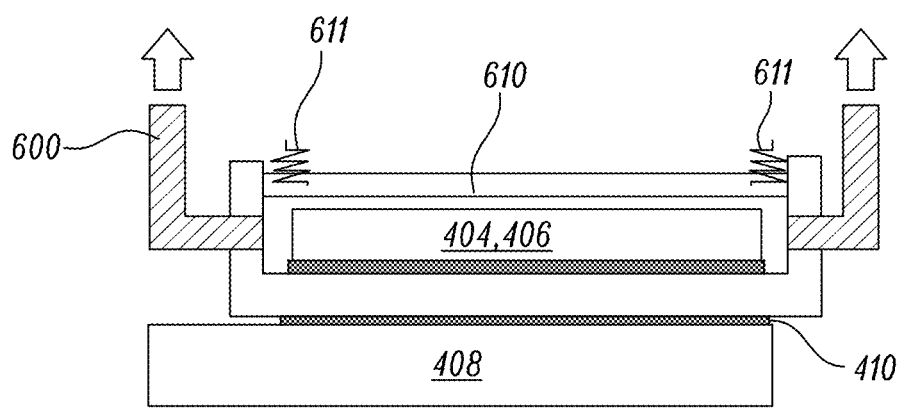
FIG. 8B is a schematic back view of the use of FIG. 8A.

In the embodiment being described, the blade 602 is sufficiently narrow/thin to fit between the first 404, 406 and second 408 layers (as shown in FIG. 8B); i.e. the blade 602 has a thickness no greater than that of the adhesive layer 410 (and generally less than that of the adhesive layer). The skilled person will appreciate that, in such embodiments, the minimum debonding force for separating the layers is not related to the thickness of the first layer, as the first layer does not need to be substantially deformed at the point of cleaving. Whilst the first layer 404, 406 is allowed to curl back as it is debonded, it is not forcibly curled back so no spring force (or only a lesser spring force) is generated in the deformed metal and the likelihood of springback may be reduced or eliminated as compared to approaches in which the first layer 404, 406 is forcibly pulled back.

Figure 7A:
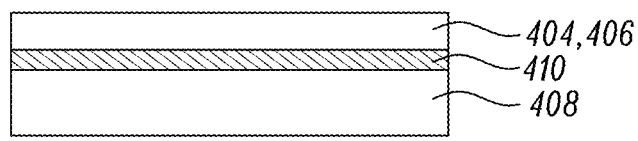
FIG. 7A is a schematic representation of first and second layers joined by an adhesive.
Figure 7B:
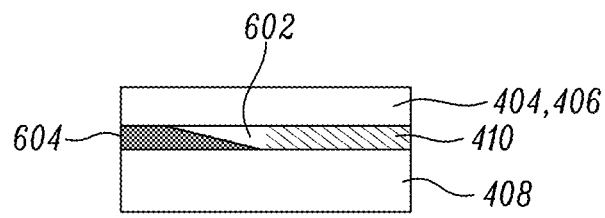
FIG. 7B is a schematic representation of use of a cleaving tool on the first and second layers joined by an adhesive as shown in FIG. 7A.

In the embodiment being described, the narrower region of the wedge element 604 is also narrow enough to fit between the layers 404, 406, 408 without deforming the first layer 404, 406. As the wedge element 604 widens, it becomes wider than the adhesive layer 410, so bending the debonded portion of the first layer 404, 406 away from the second layer 408. In the embodiment being described, each region of the first layer 404, 406 is only deformed after debonding, not simultaneously. This is illustrated in FIGS. 7 and 8.

Figure 17A:
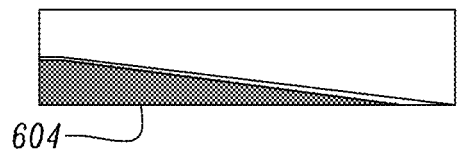
FIGS. 17A-C illustrate three different wedge angles for a cleaving tool.
Figure 17B:
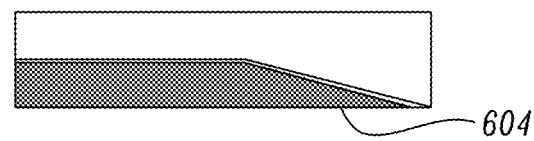
Figure 17C:
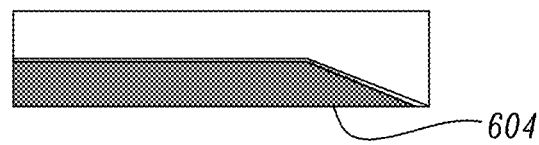

In the embodiment being described, the wedge element 604 has a wedge angle (i.e. the angle between the surfaces forming the wedge shape) of around 14° as illustrated in FIG. 17B. In other embodiments, the wedge angle may be between 5° and 30°, and optionally around 7°, as illustrated in FIG. 17A, or around 21°, as illustrated in FIG. 17C.

In the embodiment being described, the blade 602 has generally the same angle as the wedge 604, with a sharper angle on the serrated edge. In alternative embodiments, the blade 602 may be flat, may have no sharper angle on the edge, or may be differently angled, for example having a steeper angle than the wedge 604.

The cleaving tool 600 of the embodiment being described also comprises two side portions 604a, 604b, one on either side of the wedge element 604. The side portions 604a, 604b are formed integrally with the wedge element 604 in the embodiment being described, but may be separate and attached thereto in other embodiments. The side portions 604a, 604b in the embodiment being described are thicker than the wedge element 604 and extend beyond the sharp edge of the blade 602. The side portions 604a, 604b may therefore provide one or more of the following functions:

(i) provide support to the wedge element 604;
(ii) protect/shield the blade 602;
(iii) facilitate connection of the wedge element 604 to other components of the tool 600.

In alternative embodiments, no side portions 604a, 604b may be provided—instead, for example, a connector may be provided on the thicker, rear, region of the wedge element 604. Support for the wedge element 604 and/or protection of the blade 602 may not be required.

In some embodiments, the first layer 404, 406 may be arranged to be removed from the second layer 408 in strips—the width of the blade 602 of the cleaving tool 600 may be equal to or greater than strip width. In use, one side portion 604a, 604b may lie on either side of the strip being removed. The blade 602 may be arranged to be around 10 mm wider than the strip to be removed, such that the blade 602 can extend a few millimetres beyond each side of the strip.

In the embodiment being described, strip width is equivalent to wing width $W_1$, $W_2$, such that an entire wing 404, 406 can be removed as a single strip as the tool 600 is pulled along the length of the blade 400. In the embodiment being described, the blade 602 has a width, W, of around 190 mm whereas wing width 404, 406 is around 60-180 mm. The tool blade 602 can therefore be pulled along the length $L_1$ of the wing 404/the fan blade 400, removing the entire wing in a single pass.

In alternative embodiments, strip width may be less than wing width—in such embodiments, each wing 404, 406 may be cut, e.g. lengthways, into two or more strips before use of the cleaving tool 600, and one strip may be removed at a time. In still further alternative embodiments, the object 400 to be debonded may not be a fan blade 400 and the first layer may not be or comprise a wing—the skilled person will appreciate that the same principles would apply.

The cleaving tool 600 of the embodiment being described comprises a handle 606. The handle 606 is arranged to be gripped (by a user, or by a robot or the likes) so as to pull the blade 602 along a length $L_1$ of the object 400 to be debonded so as to debond the first 404, 406 and second 408 layers. The skilled person will appreciate that the tool 600 may be easier to use compared to known peeling tools, as the handle 606 may serve to convert the pulling force to cleavage stresses to the adhesive 410 in use.

In the embodiment being described, the handle 606 comprises a gripping portion 606a arranged to be gripped (by a user, and/or by a robot or the likes). The gripping portion 606a is parallel to the blade 602 in the embodiment being described. The handle 606 also comprises two struts 606b, one at each end of the gripping portion 606a. The struts 606b each connect the gripping portion 606a to an end of the blade 602. In the embodiment being described, the gripping portion 606a extends parallel to blade width and each strut 606b extends between one side region of the gripping portion 606a and a corresponding side region 604a of the blade 602.

In the embodiment being described, the struts 606b are rotatably connected to the blade 602 via a connector 608 attached to the side portions 604a,b of the wedge element 604. In alternative embodiments, the struts 606b may be directly and/or rigidly connected to the blade 602.

The cleaving tool 600 of the embodiment being described comprises a heating component 610. In the embodiment being described, the heating component 610 comprises an induction heating element. In alternative or additional embodiments, any suitable heater known in the art may be used.

In the embodiment being described, the heating component 610 is located near to and in front of the blade 602. The skilled person will appreciate that use of the heating component 610 in this position may serve to soften the adhesive 410 in advance of the blade 602, so facilitating cleaving of the adhesive 410 by the blade 602. The skilled person will appreciate that that use of the heating component 610 in this position may allow localised heating to be used instead of heating the whole object 400 to be debonded, so potentially reducing energy costs and/or reducing the chance of thermal damage to the second layer 404.

In the embodiment being described, the heating component 610 is mounted between the side portions 604a, 604b. In alternative embodiments, the heating component 610 may be differently mounted, or may be provided separately from the blade 602 and not connected thereto. In still further embodiments, no heating component may be provided.

In the embodiment being described, the heating component 610 is mounted with a sprung connection 611 to the side portions 604a,b. The sprung connection 611 is arranged to urge the heating component 610 towards the blade 602 (downwards in the orientation shown). The skilled person will appreciate that (for the orientation shown), the blade 602 is intended to lie below the first layer 404, 406 in the orientation shown, and the heating component 610 above the first layer 404, 406. The sprung connection 611 is therefore arranged to urge the heating component 610 towards an upper surface of the first layer 404, 406 in use (i.e. downwards in the orientation shown in the Figures). The heating component 610 is therefore biased towards the upper surface of the first layer 404, 406 in use. As the blade 602 is located below the first layer 404, 406, and therefore also below the heating component 610 (in the orientation shown), the heating component 610 is therefore also biased towards the blade 602. In the embodiment being described, the heating component 610 is an induction heating element and is urged into contact with the upper surface of the first layer 404, 406 in use. In alternative embodiments, the heating element 610 may be near to, but spaced from, the upper surface of the first layer 404, 406 in use.

In the embodiment being described, each side portion 604a, 604b comprises a slot 605a,b (a vertical slot, in the orientation shown) along which a mounting portion of the heating component 610 can slide under the urging of a spring 611. The skilled person will appreciate that any suitable biasing means known in the art may be used in alternative or additional embodiments. Further, in alternative embodiments, the heating component 610 may be held in a fixed position and/or not urged.

In the embodiment being described, the heating component 610 is arranged to be controllable in response to temperature feedback so as to provide a desired level of heat, e.g. to raise the temperature of the portion of the surface of the first layer 404, 406 currently being heated to a determined temperature without overheating the second layer 408 (i.e. the composite core 408 in the embodiment being described).

In the embodiment being described, the tool 600 is arranged to be used in conjunction with a power supply (not shown) arranged to power the heating component 610. The power supply may form a part of the tool 600 in some embodiments.

In the embodiment being described, the tool 600 is arranged to be used in conjunction with temperature sensing and feedback circuitry (not shown) comprising at least one sensor arranged to provide a signal indicative of the temperature of the adhesive 410 in the region being heated and/or of the surface of the first layer in the region being heated. The circuitry may be used to adjust power supplied to the heating component 610. The temperature sensing and feedback circuitry may form a part of the tool 600 in some embodiments. The skilled person will appreciate that temperature feedback may be used to ensure that the second layer 408 does not overheat, which could damage it, whilst still allowing the adhesive 410 to reach its set temperature (e.g. its glass transition temperature).

In embodiments with one or more sensors, the at least one sensor may be or comprise a temperature sensor. The temperature sensor may provide a measurement of the temperature of the surface of the first layer 404, 406, and for example may be located on or near the heating component 610. The skilled person will appreciate that, as the first layer 404, 406 is between the heating component 610 and the adhesive 410 in use, the adhesive temperature will generally be lower than or equal to the temperature of the surface of the first layer 404, 406. In the embodiment being described, the first layer 404, 406 is metallic and therefore a relatively good thermal conductor—the skilled person will appreciate that the temperature of the first layer may therefore provide a reliable estimate of the temperature of the adhesive. In alternative embodiments, the temperature sensor may provide a measurement of the temperature of the adhesive directly, for example being located on or near the blade 602.

In the embodiments being described, the temperature sensing and feedback circuitry is arranged to adjust the heat supplied by the heating component 610 based on the temperature signal and a pre-determined, desired, temperature $T_d$. In the embodiment being described, the pre-determined temperature is set to be equal to the glass transition temperature of the adhesive 410.

The tool 600 may be operated by a user/technician as described in more detail below. The skilled person will appreciate that the tool 600 as described above may have lower health and safety risks for users as compared to known hand-operated peeling tools. In particular, the metalwork to be peeled back generally has sharp edges, so peeling the metalwork manually into a spiral (similarly to opening a sardine can) may be risky to the operator due to springback from the coiled metalwork. The tool 600 provides simultaneous heating of the metalwork, and avoids the operator having to peel the metalwork into a spiral while holding a hot gas gun to heat up the metalwork.

In addition, no harmful chemicals are required as this is a thermo-mechanical process.

Figure 11:
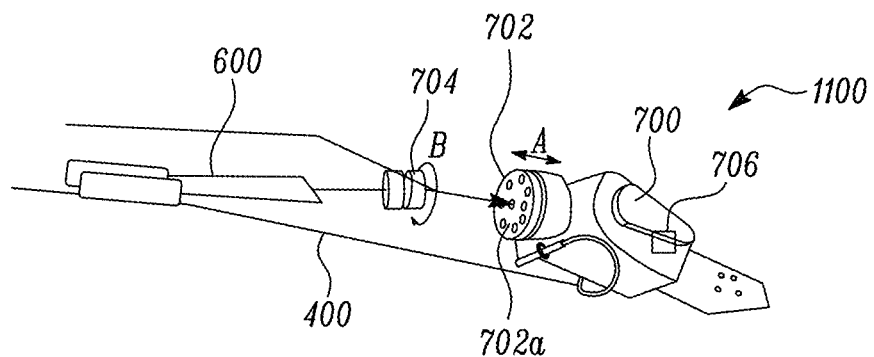
FIG. 11 is a schematic illustration of a cleaving tool being pulled by a robot.
Figure 12:
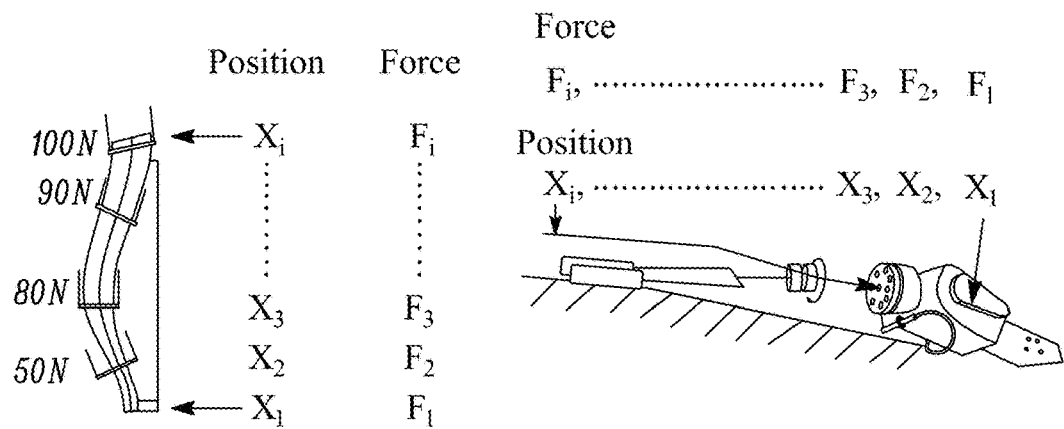
FIG. 12 is a schematic illustration of differences in forces required with position along a fan blade for a cleaving tool being pulled by a robot.

As shown in FIGS. 11 and 12, the tool 600 may alternatively be mounted on a robot 700. The combination of the tool 600 and the robot 700 may be referred to as a debonding assembly 1100.

Figure 13:
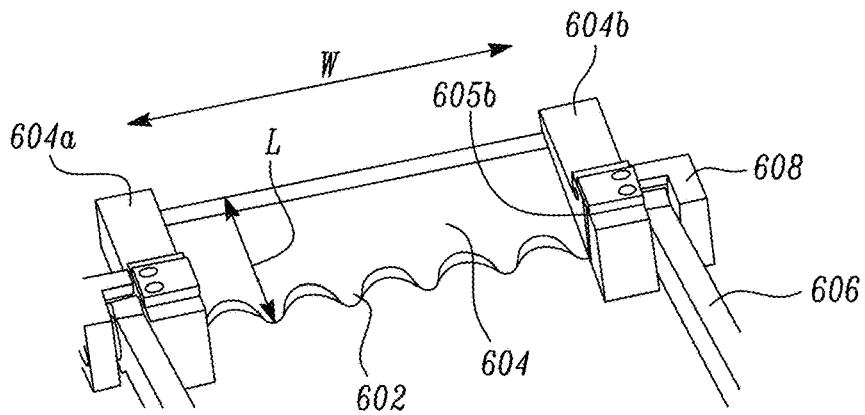
FIG. 13 is a perspective view of the blade of the cleaving tool shown in FIG. 6.

The design of the tool 600 as shown in FIGS. 6 and 13 may enable the same tool to be either attached to a robot 700 by the handle 606 for automated debonding or held by a technician to manually debond the metalwork by pulling on the tool handle 606. In various embodiments, different tools 600 may have different handles 606—for example a handle adapted to be held by a human as opposed to a handle adapted to be held by a robot 700. Different handles may be appropriate for different robots 700. Handles 606 of a particular tool 600 may be interchangeable in some embodiments.

In the assembly 1100 shown in FIG. 11, the tool 600 is attached to the end effector 702 of a standard 6-axis industrial robot arm 700. In alternative embodiments, the tool 600 may be integral with a robot arm 700 or the likes, such that the robot arm forms a part of the tool 600.

In the embodiment being described, the robot 700 is arranged to pull the tool 600 across a surface of the fan blade 400 as indicated by arrow A. The robot is arranged to rotate the tool 600 to follow the curvature of the fan blade 400 as indicated by arrow B.

In the embodiment being described, a force sensor 702a is provided on, for example embedded in, the end effector 702. Output from the force sensor 702a is used to programme the robot 700 movement and position in force control mode in the embodiment being described, as is described in more detail below. In force control mode, the robot 700 is arranged to move at a variable speed to maintain the force calculated to be required for cleaving. The skilled person will appreciate that controlling the force may reduce the risk of excessive forces being exerted by the cleaving tool 600, so reducing the risk of damaging the second layer 408 (i.e. the CFRP surface in the embodiment being described), as compared to position or speed control.

The assembly 1100 further comprises control circuitry arranged to cause the robot 700 to exert a force so as to move the blade 602. The control circuitry may be provided by a general purpose computer, or by a dedicated module, a control system 706 of a robot 700, or the likes.

The force exerted is controlled, by the control circuitry 706, to match a (theoretical) de-bonding force calculated for the region being de-bonded and the set temperature of the adhesive 410. The calculated de-bonding force may be calculated by the control circuitry, or elsewhere.

The control circuitry 706 is arranged to stop movement of the tool 600 if the calculated force is less than force required to move the cleaving tool 600 (i.e. if applying the calculated force to the adhesive 410 does not debond the first and second layers 404, 406, 408, the robot 700 pauses/allows the tool 600 to dwell in its current position rather than increasing the force applied in order to keep moving).

The control circuitry 706 is arranged to continue movement if the calculated force is higher than or equal to the force required to move the cleaving tool 600 (i.e. if applying the calculated force to the adhesive 410 does debond the first and second layers 404, 406, 408, the robot 700 can continue to move the tool 600 forward without increasing the force beyond the calculated level).

In the embodiment being described, the robot 700 has a universal joint 704 and a bearing to allow the axis to rotate freely. In alternative or additional embodiments, a ball joint or hinge and bearing may be used, or the likes.

Figure 9:
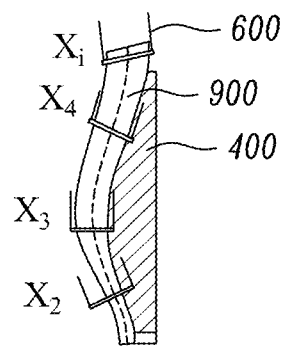
FIG. 9 illustrates differences in calculated debonding forces along a composite fan blade.

The robot 700 is arranged to pull the tool 600 along a tool path 900 as shown in FIG. 9. The tool path 900 is at least substantially parallel to the surface of the blade 400 in the embodiment being described.

Four different positions $(X_2, X_3, X_4, X_i)$ are marked on the tool path 900 of FIG. 9.

As illustrated in FIG. 9, a minimum required debonding force can be calculated for the object 400 to be debonded. The minimum required debonding force may vary along the length, $L_1$, of the tool path 900, for example, in the embodiment shown in FIG. 9, the minimum required debonding forces (in Newtons) are respectively 50N, 80N, 90N and 100N for the four different positions marked). In the embodiment shown, the debonding force in-creases along the length of the toolpath 900. In alternative embodiments, the forces may vary differently.

The tool path 900 may therefore be divided into different regions with different minimum required debonding forces for some objects 400 to be debonded. The required force may depend on the type of adhesive 410, assumed adhesive temperature, the width of the adhesive layer parallel to the fan blade 400 surface, metalwork width, stiffness of the substrates, and/or friction between a surface of the debonding tool and the adhesive.

When preparing an object 400 (a fan blade 400 in the embodiment being described) as shown in FIG. 4 for debonding, the leading edge wings are cut or machined away from the bullet 402 (i.e. the bullet 402 is cut off the blade 400), for example along the line labelled C in FIGS. 4 and 5. The wings 404, 406 form thin strips as compared to bullet thickness in the embodiment shown.

In the embodiment being described, the leading edge wings 404, 406 are removed before trailing edge wings, when both are to be removed, as the blade 400 has a small portion of overlap where the leading edge metalwork 401 sits above the trailing edge metalwork. In alternative embodiments, there may be no overlap or the overlap may be reversed, and the trailing edge metalwork may be removed first.

Figure 18:
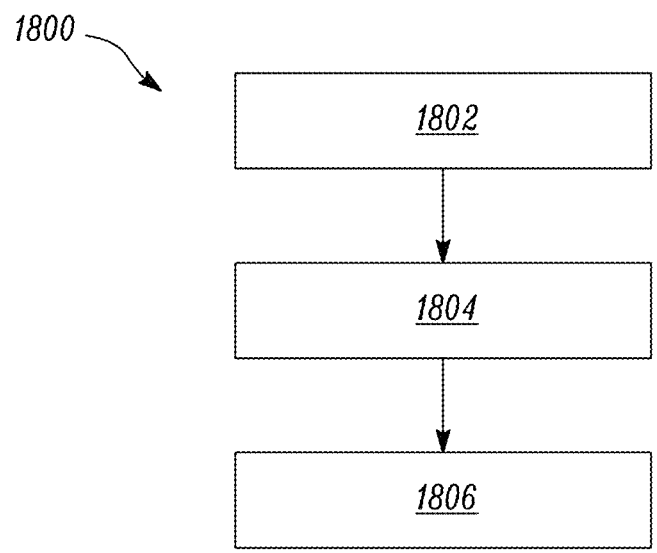
FIG. 18 illustrates a debonding method.

The debonding method 1800 is summarised in FIG. 18.

At step 1802, a heating component 610 is placed so as to heat a portion of the first layer 404, 406, and resultantly an underlying portion of the adhesive 410, to a set temperature to soften the adhesive (so weakening its bond strength as compared to that at its initial temperature—usually room temperature).

In the embodiment being described, the heating component 610 is an induction heater.

In the embodiment being described, the heating component 610 is used to raise the adhesive 410 to a temperature at or near the adhesive's glass transition temperature. In the embodiment being described, the adhesive 410 is an epoxy adhesive and its glass transition temperature is around 120-140° C.

In the embodiment being described the input power to the heating component 610 of the cleaving tool 600 may be varied in order to maintain a desired pre-determined temperature, $T_d$, on the surface of the first layer 404, 406. The skilled person will appreciate that the speed of the tool 600 may vary, and that a higher power may be desired when the tool is moving more quickly to allow the first layer 404, 406 to reach the pre-determined temperature, and vice versa.

The skilled person will appreciate that keeping heating time short may reduce the chance of damaging the second layer 408. For example, a heating time of less than ten seconds may be used to reach 121° C.-160° C. at the first layer 404, 406-adhesive 410 interface (e.g. the titanium-epoxy interface for the blade 400 being described for the present embodiment).

In alternative embodiments, step 1802 may not be performed.

At step 1804, a blade 602 of a cleaving tool 600 is inserted between the first 404, 406 and second 408 layers.

In the embodiment being described, the heating component 610 is mounted on the tool 600 such that the same movement of the tool 600 can perform steps 1802 and 1804. The steps may therefore be simultaneous. In alternative embodiments, the steps may be performed separately in either order.

At step 1806, a controlled force is exerted on the cleaving tool 600. An attempt is thereby made to move the cleaving tool 600 so as to de-bond the first 404, 406 and second 408 layers in a region, with the force exerted for the attempted movement being controlled to match a de-bonding force calculated for the region and the set temperature of the adhesive 410 (in embodiments in which the adhesive is not heated, a set temperature may not be relevant or used). Movement of the cleaving tool 600 does not begin/stops if the calculated force is less than force required to move the cleaving tool 600 (i.e. if the force exerted is in-sufficient), and continues/re-starts if the calculated force is higher than or equal to the force required to move the cleaving tool (i.e. if the exerted force is sufficient).

For some objects to be debonded, the calculated force may be the same for the entire layer 404, 406 to be debonded. In such cases, a robot 700 may be programmed, or a user trained, to exert a constant force and to pause (rather than pulling harder) if the bonding is too strong to allow movement with the set applied force. The calculated force is retained during the pause/dwell in the embodiment being described. In alternative embodiments, the force may be removed and then reapplied after a time interval.

The skilled person will appreciate that the dwell time of the tool 600 may allow the adhesive 410 to increase in temperature, so reducing the force required to continue. Once the force required to continue reduces to the level of the exerted constant force, movement of the tool 600 is resumed. Tool velocity may therefore vary whilst force applied is kept constant. If tool position/velocity were set instead, the force applied would vary and could exceed the calculated force, for example if a region of adhesive 410 reached by the blade has not yet reached the set temperature. In embodiments in which the calculated force is not the same for the entire layer 404, 406 to be debonded, the same principles apply with "constant force" being replaced with "calculated force for the current tool position".

The skilled person will appreciate that automating the force-control mode cleaving action can be performed using a force control algorithm. A force sensor 702a may be provided and arranged to provide a force signal output as feedback, in order for the robot 700 to 'feel' the adhesive interface and debond the layers 404, 406, 408.

Referring to FIG. 12, the cleaving tool 600 attached to robot 700 is shown in positions be $X_1$ to $X_i$. A calculated debonding force ($F_1$ to $F_i$) is calculated for each position (the calculated force may allow for a margin above a theoretical minimum force required for debonding). The calculated force is the pulling force to be exerted by the robot 700 at the corresponding position.

In the embodiment being described, the robot force control direction is parallel to the fan blade 400 surface, tangential to the tool path 900 direction.

The force required to debond the layers 404, 406, 408 at each position may be represented as $F^d_1(T)$ to $F^d_i(T)$, illustrating that the debonding force is a function of the adhesive temperature, T.

At $X_1$, the force exerted by the robot is $F_1$, while the temperature of the surface of the first layer 404, 406 is maintained at $T_d$. Barring discrepancies between theory and practice (e.g. due to embedded foreign bodies, the presence of a different adhesive from that modelled, or damage affecting a heating profile or the likes) $F_1$ should be equal to or slightly above $F^d_1(T_d)$ in the embodiment being described—i.e. the calculated, applied force should be equal to the actual debonding force required once the adhesive 410 has thermally equilibrated with the heated surface of the first layer 404, 406, or slightly above it (e.g. due to a chosen margin being added to the calculated force to allow for small discrepancies from the assumptions used in the calculation).

The robot 700 is moved along the tool path from $X_1$ to $X_i$.

The force control mode operates as follows in the embodiments being described:

If $F_1 < F^d_1(T)$, for a current adhesive temperature T, the tool 600 will remain at $X_1$, so allowing more thermal energy to be conducted from the heated surface of the first layer 404, 406 to the adhesive 410. The skilled person will appreciate that it may take time for equilibrium to be reached, i.e. for the temperature of the adhesive 410 to reach $T_d$. As the temperature of the adhesive 410 reaches $T_d$, $F_1 >= F^d_1(T)$.

Once $F_1$ is greater than or equal to the actual debonding force required for the layers to debond, the blade 602 moves forward to $X_2$.

In the embodiment being described, the exerted cleaving force changes to $F_2$ as the blade 602 moves forward to $X_2$, as a different debonding force had been calculated for position $X_2$. In other embodiments, the exerted force may not change.

If $F_2 < F^d_2(T)$, the tool 600 dwells. If $F_2 >= F^d_2(T)$, the tool 600 advances.

Figure 19:
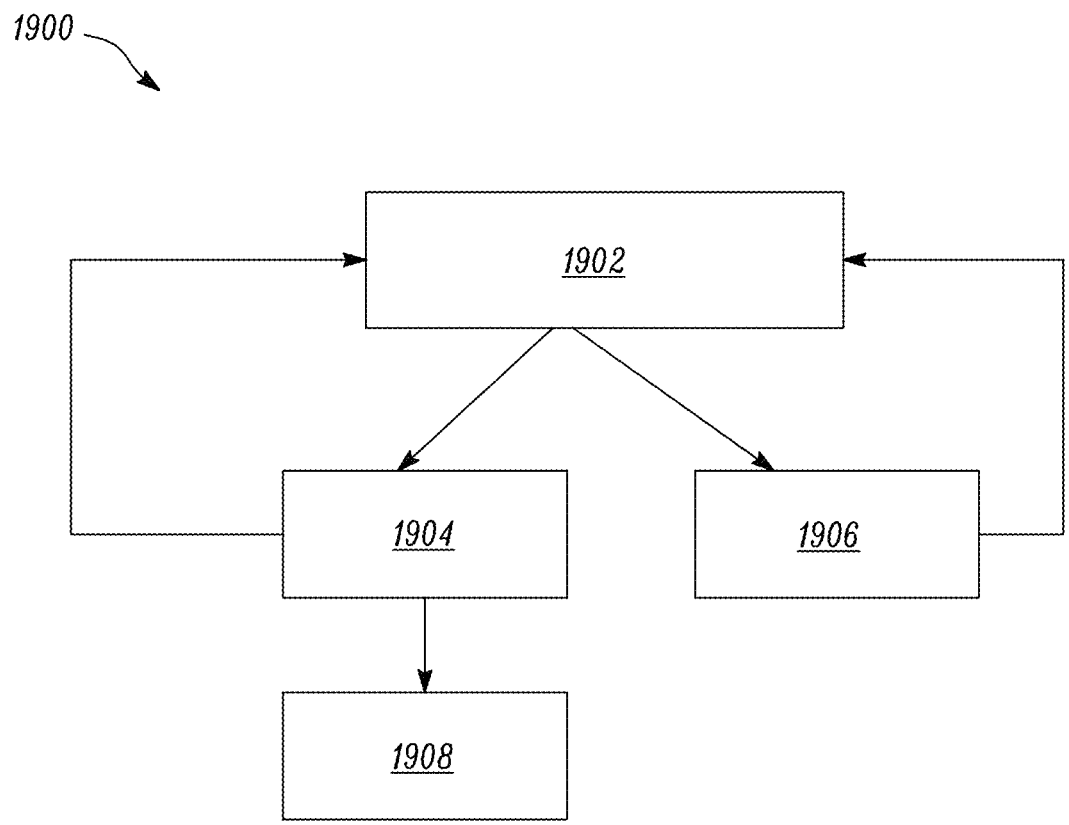
FIG. 19 illustrates a cleaving tool control process of a debonding method.

A control method 1900 of an embodiment is summarised below and is illustrated in FIG. 19.

At step 1902, a determination is made as to whether or not the calculated force to be exerted is sufficient to advance the blade 602. If the determination is positive, the method 1900 moves to step 1904.

If the determination is negative, the method 1900 moves to step 1906. At step 1906, the tool 600 is held in its current position for a dwell time. The method then returns to step 1902 so that another determination is made.

At step 1904, the blade 602 is moved forward. The method 1900 returns to step 1902, unless the end of the object 400 to be debonded, or the portion to be debonded of the object, has been reached.

The skilled person will appreciate that determinations 1902 may be made at least substantially continuously or at predetermined intervals.

In the embodiment being described, at step 1906, a predetermined interval is allowed to elapse before the method returns to step 1902 so that another determination is made. The force on the tool 600 is released for the duration of the predetermined interval and reapplied at the end of the predetermined interval to allow a fresh determination 1902 to be made. The total dwell time is therefore a multiple of the predetermined interval (assuming that a constant predetermined interval is used). In the embodiment being described, the predetermined interval is between 0.05 seconds and 5 seconds, for example between 0.01 and 1 second, or between 0.05 and 1 second, or around 0.5 seconds or around 1 second.

In the embodiment being described, at step 1904 the force on the tool 600 is maintained whilst the tool 600 moves. In such embodiments, determinations are effectively made continuously and the tool 600 continues moving forward provided that the required de-bonding force has not risen to a level above the applied, calculated force. In alternative embodiments, determinations may instead be made at predetermined intervals, which may be determined based on time and/or displacement.

The method 1900 is terminated at step 1908, when the end of the object 400 to be debonded, or the portion to be debonded of the object, is reached.

In alternative embodiments, the force on the tool 600 may be maintained, such that the pressure on the adhesive 410 is maintained during the dwell time of the tool 600. The force on the tool 600 is therefore not released in such embodiments, but rather maintained at the set level for the position until the tool 600 can move forward.

In such embodiments, determinations may effectively be made continuously and the tool 600 immediately starts to move forward in response to the required debonding force dropping low enough to be equal to the applied, calculated force. In such embodiments, the dwell time may have any length and no predetermined period may be set.

In such embodiments, the "determinations" are automatic, in that the tool 600 keeps or re-starts moving if the calculated de-bonding force is sufficient to debond the layers, or stays in place is not, as a result of the continuously-exerted force. The magnitude of the continuously-exerted force may vary as described above.

In Summary:

At Position=$X_1$,
  a. If $F_1 < F^d_1(T)$, wait (adhesive will heat up to equilibrium)
  b. If $F_1 >= F^d_1(T)$, the force exerted will cause the tool to move to $X_2$, At Position=x2,
  c. If $F_2 < F^d_2(T)$, wait (adhesive will heat up to equilibrium)
  d. If $F_2 >= F^d_2(T)$, the force exerted will cause the tool to move to $X_3$, Repeat for subsequent positions until the end of the object 400 to be debonded, or of the portion to be debonded of the object 400, is reached.

This control strategy permits debonding while maintaining $T_d$ to prevent over-heating. As the heat conduction through the fan blade 400 is complex (metalwork 402-406 has varying thickness etc. affecting the heat conduction), the time taken for the adhesive 410 interface to reach $T_d$ often varies depending on position. Hence, the control strategy of the embodiment being described takes this into consideration and allows the dwell time of the tool 600 to vary (as opposed to a position control/fixed robot feed-rate strategy). It also allows just enough force to be supplied to debond the layers, avoiding excessive force which could damage the second layer 408.

In various embodiments, a computer-readable medium may be arranged to contain instructions arranged to cause a processing unit reading those instructions to perform the control strategy 1800, 1900 described above. The computer-readable medium may be arranged to be read by a processing unit of a control system 706 arranged to control a robot 700. The instructions may include instructions to cause the robot 700 to insert the blade 602 into the adhesive 410, and/or to position the heating component 610 in some embodiments; in other embodiments, either or both of those steps may be performed separately, e.g. manually by an operator.

Figures 14A, 14B:
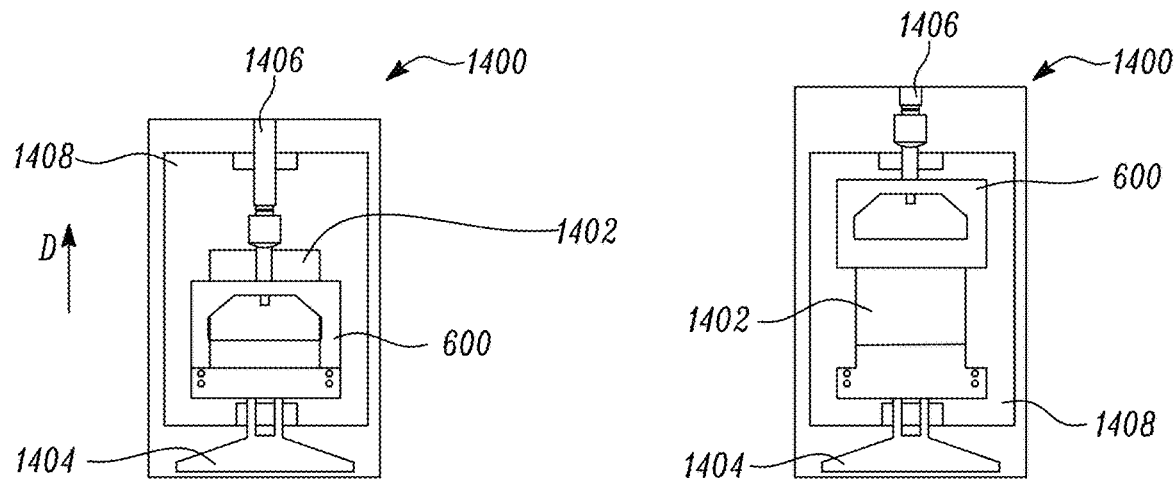
FIGS. 14A and 14B show schematic plan views of a testing configuration in its initial and final positions, respectively.
Figure 15:
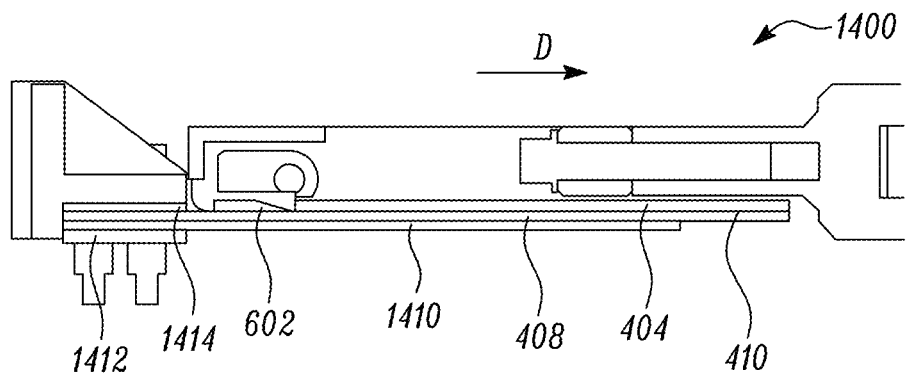
FIG. 15 shows a schematic side view of the testing configuration shown in FIGS. 14A and 14B.

FIGS. 14 and 15 illustrate testing of a tool 600 of an embodiment using a Universal Testing Machine (UTM).

In the testing configuration 1400 shown, a sample 1402, or test coupon, is provided as the object to be debonded. One end of the sample 1402 is rigidly connected to a UTM fixture 1404 of the UTM. The sample 1402 comprises a first layer 404 made of aluminium and a second layer 408 made of a composite material in the embodiment shown. In this embodiment, the second layer 408 extends further than the first layer 404. The first and second layers 404, 408 are held together by an adhesive 410.

A tool 600 of an embodiment is connected to the UTM column 1406, and placed such that the blade 602 aligns with an adhesive layer 410 of the sample 1402. The UTM column 1406 is then moved in the direction of motion labelled by arrow D, so pulling the tool 600 across the sample 1402 from an initial position as shown in FIG. 14A to a final position as shown in FIG. 14B. In the embodiment being described, the stroke length, and therefore the distance moved by the tool 600 across the sample 1402 when pulled, is 170 mm. In alternative embodiments, a different stroke length may be selected.

In the embodiment shown, the sample 1402 and tool 600 are contained within a chamber 1408 of the UTM. In this embodiment, the chamber is a thermal chamber maintained at a constant temperature of $T_d$. The sample 1402 may be allowed to equilibrate with the thermal chamber 1408 before testing. The skilled person will appreciate that this testing configuration 1400 may therefore be useful in assessing different blade shapes and/or wedge angles, and/or in adjusting the form and/or parameters of a formula for calculating de-bonding forces, and/or in testing the accuracy of calculated debonding forces. The use of a thermal chamber 1408 and thermal equilibrium conditions may avoid variable speeds and dwell times for heating.

$F_1$ to $F_i$ and $X_1$ to $X_i$ for an object 400 to be debonded may be set based on experimental trials performed on such test coupons 1402.

In the configuration 1400 shown, the sample 1402 is supported on a support plate 1410 which is clamped to the UTM fixture 1404 by means of a clamp plate 1414 which holds the second layer 408 and the support plate 1410 between the clamp plate 1414 and an end tab 1412.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A method of debonding a first layer from a second layer, wherein the first layer is bonded to the second layer by an adhesive located between the first layer and the second layer, the method comprising:
    inserting a blade of a cleaving tool between the first layer and the second layer, the blade being formed of a flexible material, and during insertion of the blade, the blade flexes from a first shape to conform to a second shape being a curvature of the first layer and the second layer;

applying heat, using a heating component, to a portion of the adhesive to heat the adhesive to a pre-determined temperature;

exerting a set controlled force on the cleaving tool to move and flex the cleaving tool from the first shape to the second shape that conforms to the shape of the curvature of the first layer and the second layer, so as to de-bond the first layer and the second layer in a region that includes the heated portion of the adhesive, the controlled force exerted is set to match a de-bonding force calculated for the region based on the pre-determined temperature to which the adhesive is heated; and upon the movement of the cleaving tool stopping due to the calculated controlled force being less than a force required to move the cleaving tool, maintaining the calculated controlled force while continuing to apply heat to the portion of the adhesive, such that the cleaving tool resumes movement upon the adhesive reaching the pre-determined temperature and the controlled force being at least equal to the force required to move the cleaving tool.

2. The method of claim 1, wherein the exerting the controlled force exerted is performed by a control system including one or more processors.

3. The method of claim 2, wherein the cleaving tool is mounted on a robot, and the robot performs the exerting of the controlled force on the cleaving tool.

4. The method of claim 1, further comprising varying input power to the heating component in order to maintain a pre-determined temperature, on a surface of the first layer, and the pre-determined temperature of the surface is equal to the pre-determined temperature of the adhesive.

5. The method of claim 1, wherein the calculated debonding force is a function of position along the first layer and the second layer, and the controlling of the force on the cleaving tool includes adjusting the exerted force as the cleaving tool moves.

6. The method of claim 1, wherein the first layer is a metallic layer and the second layer is a carbon fibre reinforced polymer layer.

7. The method of claim 1, wherein the first layer is a wing of leading-edge metalwork of a fan blade and the second layer is a composite portion of the fan blade.

8. The method of claim 1, wherein the exerting the force on the cleaving tool to move the cleaving tool includes pulling the cleaving tool by a handle of the cleaving tool.

9. A cleaving tool arranged to debond a first layer from a second layer, wherein the first layer is bonded to the second layer by an adhesive located between the first layer and the second layer, the cleaving tool comprising:

a blade arranged to be inserted between the first layer and the second layer, the blade being formed of a flexible material, and during insertion of the blade, the blade flexes from a first shape to conform to a second shape being a curvature of the first layer and the second layer;

control circuitry arranged to exert a set controlled force so as to move the blade so as to de-bond the first layer and the second layer in a region that includes the heated portion of the adhesive, the controlled force exerted being set to match a de-bonding force calculated for the region based on the pre-determined temperature to which the adhesive is heated, and upon the movement of the cleaving tool stopping due to the calculated controlled force being less than a force required to move the cleaving tool, the calculated controlled force is maintained while continuing to apply heat to the portion of the adhesive, such that the cleaving tool resumes movement upon the adhesive reaching the pre-determined temperature and the controlled force being at least equal to the force required to move the cleaving tool.

10. The cleaving tool of claim 9, further comprising a heating component arranged to heat the portion of adhesive to the set temperature at which the adhesive softens, and wherein the de-bonding force calculated for the region is calculated using the set temperature as the temperature of the adhesive.

11. The cleaving tool of claim 9, further comprising a wedge-shaped member having a narrower forward region relative to a wider rear region, the blade being located on the narrower forward region of the wedge-shaped member, and the wedge-shaped member has an angle of between 3° and 30°.

12. The cleaving tool of claim 9, wherein the cleaving tool is arranged to be mounted on, and moved by, a robot.

13. The cleaving tool of claim 9, wherein the blade has a thickness less than a thickness of the adhesive, and the blade is serrated.

14. A debonding assembly arranged to de-bond a first layer from a second layer, wherein the first layer is bonded to the second layer by an adhesive located between the first layer and the second layer, the debonding assembly comprising:

a cleaving tool including a blade arranged to be inserted between the first layer and the second layer, the blade being formed of a flexible material, and during insertion of the blade, the blade flexes from a first shape to conforms to a second shape being a curvature of the first layer and the second layer;

a robot arranged to move the cleaving tool so as to de-bond the first layer and the second layer in a region that includes the heated portion of the adhesive; and a control system arranged to control the robot to exert a set controlled force on the cleaving tool to move the cleaving tool, the controlled force exerted being set to match a de-bonding force calculated for the region based on a pre-determined temperature to which the adhesive is heated, and upon the movement of the cleaving tool stopping due to the calculated controlled force being less than a force required to move the cleaving tool, the calculated controlled force is maintained while continuing to apply heat to the portion of the adhesive, such that the cleaving tool resumes movement upon the adhesive reaching the pre-determined temperature and the controlled force being at least equal to the force required to move the cleaving tool.

15. The debonding assembly of claim 14, wherein the cleaving tool includes a heating component arranged to heat the portion of the adhesive to the pre-determined temperature to soften the adhesive, and wherein the de-bonding force calculated for the region is calculated using a set temperature as the pre-determined temperature of the adhesive.

16. The debonding assembly of claim 15, further comprising a power supply configured to provide varying input power to the heating component in order to maintain a pre-determined temperature on a surface of the first layer, and wherein the pre-determined temperature of the surface is equal to the pre-determined temperature for the adhesive.

17. The debonding assembly of claim 16, wherein the calculated debonding force is a function of position along the first layer and the second layer, and the controlling the force on the cleaving tool includes adjusting the exerted force with position as the cleaving tool moves.

\* \* \* \* \*